(12) United States Patent
Bao et al.

(10) Patent No.: US 12,413,992 B2
(45) Date of Patent: Sep. 9, 2025

(54) POSITIONING REFERENCE SIGNALS (PRS)-ASSISTED BEAM MANAGEMENT FOR COMMUNICATION

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Juan Montojo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 875 days.

(21) Appl. No.: 17/451,429

(22) Filed: Oct. 19, 2021

(65) Prior Publication Data
US 2022/0124534 A1  Apr. 21, 2022

Related U.S. Application Data

(60) Provisional application No. 63/094,262, filed on Oct. 20, 2020.

(51) Int. Cl.
*H04W 24/10* (2009.01)
*H04B 7/06* (2006.01)
(Continued)

(52) U.S. Cl.
CPC ........ *H04W 24/10* (2013.01); *H04B 7/06952* (2023.05); *H04L 5/0048* (2013.01); *H04W 24/08* (2013.01)

(58) Field of Classification Search
CPC .................................................. H04W 24/10
See application file for complete search history.

(56) References Cited

U.S. PATENT DOCUMENTS

2014/0329520 A1* 11/2014 Militano ............... G01S 5/0258
455/422.1
2016/0033617 A1* 2/2016 Hahn ..................... G01S 5/0218
370/252
(Continued)

FOREIGN PATENT DOCUMENTS

DE  102021112407 A1 * 12/2021 ........ H04W 74/0833
EP  3648496 A1  5/2020

OTHER PUBLICATIONS

Ericsson: "Beam Selection for PRS Transmission in FR2", 3GPP Draft, 3GPP TSG-RAN WG2 #107, R2-1910660—Beam Selection in FR2, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019 (Aug. 16, 2019), XP051768431, 5 Pages, Retrieved from the Internet: URL:http://www.3gpp.org/ftp/tsg_ran/WG2_RL2/TSGR2_107/Docs/R2-1910660.zip [retrieved on Aug. 16, 2019] Section 2.

(Continued)

*Primary Examiner* — Abdeltif Ajid
(74) *Attorney, Agent, or Firm* — NORTON ROSE FULBRIGHT US LLP

(57) ABSTRACT

This disclosure provides systems, methods, and devices for wireless communication that support positioning reference signal (PRS)-assisted beam management. In particular, various aspects of the present disclosure provide techniques for a network entity to select a beam of a plurality of beams for communications between a base station and a user equipment (UE) based on line-of-sight (LOS) path detection results. In some implementations, the LOS path detection results may include an indication as to whether a PRS includes an LOS path signal and/or an NLOS, and/or a signal strength of the LOS path signal, as well as other information that a network entity (e.g., a UE or a base (Continued)

1000

Measure at least one characteristic of each positioning reference signal (PRS) of a plurality of PRSs, the at least one characteristic including at least one line-of-sight (LOS) path-related measurement indicating whether a respective PRS includes one or more of a signal associated with an LOS path or a signal associated with a non-LOS (NLOS) path — 1002

Transmit a PRS measurement report including the at least one characteristic of each PRS of the plurality of PRS to a location management function (LMF) network entity, wherein the LMF network entity is configured to generate, based on the PRS measurement report, beam management information — 1004 station) may use in a beam management procedure (e.g., to select a beam). Other aspects and features are also claimed and described.

47 Claims, 13 Drawing Sheets

(51) Int. Cl.
*H04L 5/00* (2006.01)
*H04W 24/08* (2009.01)

(56) References Cited

U.S. PATENT DOCUMENTS

| | | | | |
|---|---|---|---|---|
| 2017/0302355 | A1* | 10/2017 | Islam | H04B 7/0695 |
| 2019/0253900 | A1* | 8/2019 | Narasimha | H04W 4/025 |
| 2020/0412438 | A1* | 12/2020 | Yang | H04B 7/088 |
| 2021/0266773 | A1* | 8/2021 | Lee | H04W 64/00 |
| 2021/0333353 | A1* | 10/2021 | Busin | G01S 5/0244 |
| 2021/0409967 | A1* | 12/2021 | Franke | H04W 16/28 |
| 2022/0039048 | A1* | 2/2022 | Khoryaev | H04W 64/00 |
| 2022/0113364 | A1* | 4/2022 | Zhou | G01S 5/0205 |
| 2022/0173857 | A1* | 6/2022 | Michalopoulos | H04L 5/0035 |
| 2022/0271818 | A1* | 8/2022 | Svendsen | H04B 7/0897 |
| 2023/0041613 | A1* | 2/2023 | Zheng | H04W 24/10 |
| 2023/0080149 | A1* | 3/2023 | Liu | G01S 5/0244 |
| | | | | 455/456.1 |
| 2023/0388959 | A1* | 11/2023 | Hasegawa | G01S 5/0036 |

OTHER PUBLICATIONS

Fraunhofer Iis, et al., "NR Beam Management Supporting Multi-gNB Measurements for Positioning", 3GPP Draft, R1-1813583, 3GPP TSG RAN WG1 Meeting #95, NR_Multi_TRP_Beam_Management_for_TDOA_Posttioning, 3rd Generation Partnership Project (3GPP), Mobile Competence Centre, 650, Route Des Lucioles, F-06921 Sophia-Antipolis Cedex, France, vol. RAN WG1, No. Spokane, US, Nov. 12, 2018-Nov. 16, 2018, Nov. 2, 2018 (Nov. 2, 2018), XP051479922, 8 pages, Retrieved from the Internet: URL: http://www.3gpp.org/ftp/tsg%5Fran/WG1%5FRL1/TSGR1%5F95/Docs/R1%2D1813583%2Ezip. [retrieved on Nov. 2, 2018] the whole document.
International Search Report and Written Opinion—PCT/US2021/071942—ISA/EPO—Feb. 23, 2022 (2100131WO).

* cited by examiner

POSITIONING REFERENCE SIGNALS (PRS)-ASSISTED BEAM MANAGEMENT FOR COMMUNICATION

CROSS-REFERENCE TO RELATED APPLICATIONS

This application claims the benefit of U.S. Provisional Patent Application No. 63/094,262, entitled, "POSITIONING REFERENCE SIGNALS (PRS)-ASSISTED BEAM MANAGEMENT FOR COMMUNICATION," filed on Oct. 20, 2020, which is expressly incorporated by reference herein in its entirety.

TECHNICAL FIELD

Aspects of the present disclosure relate generally to wireless communication systems, and more particularly, to positioning reference signal (PRS) assisted beam management.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes determining the UE's location based on at least one characteristic of each positioning reference signal (PRS) of a plurality of PRSs. In aspects, the at least one characteristic includes line-of-sight (LOS) path measurements. The method further includes causing a selection of a beam of a plurality of beams in a beam management procedure for communication between the UE and a base station of a plurality of base stations. In aspects, the selection of the beam is based on the LOS path measurements and the UE's location.

In an additional aspect of the disclosure, a method of wireless communication performed by a base station includes receiving, from a location management function (LMF) network entity, a plurality of PRS-assisted beam management messages, each PRS-assisted beam management message associated with a PRS of a plurality of PRS received by a UE and associated with a respective base station of a plurality of base stations. The method further includes receiving, from the LMF network entity, an indication of the UE's location, and selecting, based on the plurality of PRS-assisted beam management messages and the UE's location, a beam of a plurality of beams in a beam management procedure for communication between the base station and the UE.

In an additional aspect of the disclosure, a method of wireless communication performed by a first network entity includes receiving, from a second network entity, a PRS measurement report, the measurement report including at least one characteristic of each PRS of a plurality of PRS. In aspects, the at least one characteristic includes LOS path measurements, and each PRS is associated with a base station of a plurality of base stations. The method further includes determining a UE's location based on the at least one characteristic of each PRS of the plurality of PRS, and causing a selection of a beam of a plurality of beams in a beam management procedure for communication between the UE and a base station of the plurality of base stations. In aspects, the selection of the beam based on the LOS path measurements.

In an additional aspect of the disclosure, an apparatus configured for wireless communication is disclosed. The apparatus includes at least one processor, and a memory coupled to the at least one processor. The at least one processor is configured to determine the UE's location based on at least one characteristic of each PRS of a plurality of PRSs. In aspects, the at least one characteristic includes LOS path measurements. The at least one processor is further configured to cause a selection of a beam of a plurality of beams in a beam management procedure for communication between the UE and a base station of a plurality of base stations. In aspects, the selection of the beam is based on the LOS path measurements and the UE's location.

In an additional aspect of the disclosure, an apparatus configured for wireless communication is disclosed. The apparatus includes at least one processor, and a memory coupled to the at least one processor. The at least one processor is configured to receive, from an LMF network entity, a plurality of PRS-assisted beam management messages, each PRS-assisted beam management message associated with a PRS of a plurality of PRS received by a UE and associated with a respective base station of a plurality of base stations. The at least one processor is further configured to receive, from the LMF network entity, an indication of the UE's location, and to select, based on the plurality of PRS-assisted beam management messages and the UE's location, a beam of a plurality of beams in a beam management procedure for communication between the base station and the UE.

In an additional aspect of the disclosure, an apparatus configured for wireless communication is disclosed. The apparatus includes at least one processor, and a memory coupled to the at least one processor. The at least one processor is configured to receive, from a second network entity, a PRS measurement report, the measurement report including at least one characteristic of each PRS of a plurality of PRS. In aspects, the at least one characteristic includes LOS path measurements, and each PRS is associated with a base station of a plurality of base stations. The at least one processor is further configured to determine a UE's location based on the at least one characteristic of each PRS of the plurality of PRS, and to cause a selection of a beam of a plurality of beams in a beam management procedure for communication between the UE and a base station of the plurality of base stations. In aspects, the selection of the beam based on the LOS path measurements.

In an additional aspect of the disclosure, an apparatus configured for wireless communication is disclosed. The apparatus includes means for determining the UE's location based on at least one characteristic of each PRS of a plurality of PRSs. In aspects, the at least one characteristic includes LOS path measurements. The apparatus further includes means for causing a selection of a beam of a plurality of beams in a beam management procedure for communication between the UE and a base station of a plurality of base stations. In aspects, the selection of the beam is based on the LOS path measurements and the UE's location.

In an additional aspect of the disclosure, an apparatus configured for wireless communication is disclosed. The apparatus includes means for receiving, from a LMF network entity, a plurality of PRS-assisted beam management messages, each PRS-assisted beam management message associated with a PRS of a plurality of PRS received by a UE and associated with a respective base station of a plurality of base stations. The apparatus further includes means for receiving, from the LMF network entity, an indication of the UE's location, and means for selecting, based on the plurality of PRS-assisted beam management messages and the UE's location, a beam of a plurality of beams in a beam management procedure for communication between the base station and the UE.

In an additional aspect of the disclosure, an apparatus configured for wireless communication is disclosed. The apparatus includes means for receiving, from a second network entity, a PRS measurement report, the measurement report including at least one characteristic of each PRS of a plurality of PRS. In aspects, the at least one characteristic includes LOS path measurements, and each PRS is associated with a base station of a plurality of base stations. The apparatus further includes means for determining a UE's location based on the at least one characteristic of each PRS of the plurality of PRS, and means for causing a selection of a beam of a plurality of beams in a beam management procedure for communication between the UE and a base station of the plurality of base stations. In aspects, the selection of the beam based on the LOS path measurements.

In an additional aspect of the disclosure, a non-transitory computer-readable medium stores instructions that, when executed by a processor, cause the processor to perform operations including determining the UE's location based on at least one characteristic of each PRS of a plurality of PRSs. In aspects, the at least one characteristic includes LOS path measurements. The operations further include causing a selection of a beam of a plurality of beams in a beam management procedure for communication between the UE and a base station of a plurality of base stations. In aspects, the selection of the beam is based on the LOS path measurements and the UE's location.

In an additional aspect of the disclosure, a non-transitory computer-readable medium stores instructions that, when executed by a processor, cause the processor to perform operations including receiving, from a LMF network entity, a plurality of PRS-assisted beam management messages, each PRS-assisted beam management message associated with a PRS of a plurality of PRS received by a UE and associated with a respective base station of a plurality of base stations. The operations further include receiving, from the LMF network entity, an indication of the UE's location, and selecting, based on the plurality of PRS-assisted beam management messages and the UE's location, a beam of a plurality of beams in a beam management procedure for communication between the base station and the UE.

In an additional aspect of the disclosure, a non-transitory computer-readable medium stores instructions that, when executed by a processor, cause the processor to perform operations including receiving, from a second network entity, a PRS measurement report, the measurement report including at least one characteristic of each PRS of a plurality of PRS. In aspects, the at least one characteristic includes LOS path measurements, and each PRS is associated with a base station of a plurality of base stations. The operations further include determining a UE's location based on the at least one characteristic of each PRS of the plurality of PRS, and causing a selection of a beam of a plurality of beams in a beam management procedure for communication between the UE and a base station of the plurality of base stations. In aspects, the selection of the beam based on the LOS path measurements.

In one aspect of the disclosure, a method of wireless communication performed by a UE includes measuring at least one characteristic of each PRS of a plurality of PRSs, the at least one characteristic including at least one LOS path-related measurement indicating whether a respective PRS includes one or more of a signal associated with an LOS path or a signal associated with a non-LOS (NLOS) path. The method further includes transmitting a PRS measurement report including the at least one characteristic of each PRS of the plurality of PRS to an LMF network entity. In aspects, the LMF network entity is configured to generate, based on the PRS measurement report, beam management information.

In an additional aspect of the disclosure, a method of wireless communication performed by a first network entity includes receiving, from a second network entity, a PRS measurement report, the measurement report including at least one characteristic of each PRS of a plurality of PRS, and generating, for each PRS of the plurality of PRSs, a PRS-assisted beam management message. In aspects, the PRS-assisted beam management message is configured to facilitate selection, by the second network entity, of a beam of a plurality of beams in a beam management procedure for communication between a base station and a UE.

In an additional aspect of the disclosure, an apparatus configured for wireless communication is disclosed. The apparatus includes at least one processor, and a memory coupled to the at least one processor. The at least one processor is configured to measure, by a UE, at least one characteristic of each PRS of a plurality of PRSs, the at least one characteristic including at least one LOS path-related measurement indicating whether a respective PRS includes one or more of a signal associated with an LOS path or a signal associated with an NLOS path. The at least one processor is further configured to transmit a PRS measurement report including the at least one characteristic of each PRS of the plurality of PRS to an LMF network entity. In aspects, the LMF network entity is configured to generate, based on the PRS measurement report, beam management information.

In an additional aspect of the disclosure, an apparatus configured for wireless communication is disclosed. The apparatus includes at least one processor, and a memory coupled to the at least one processor. The at least one processor is configured to receive, by a first network entity from a second network entity, a PRS measurement report, the measurement report including at least one characteristic of each PRS of a plurality of PRS, and to generate, for each PRS of the plurality of PRSs, a PRS-assisted beam management message. In aspects, the PRS-assisted beam management message is configured to facilitate selection, by the second network entity, of a beam of a plurality of beams in a beam management procedure for communication between a base station and a UE.

In an additional aspect of the disclosure, a non-transitory computer-readable medium stores instructions that, when executed by a processor, cause the processor to perform operations including measuring, by a UE, at least one characteristic of each PRS of a plurality of PRSs, the at least one characteristic including at least one LOS path-related measurement indicating whether a respective PRS includes one or more of a signal associated with an LOS path or a signal associated with an NLOS path. The operations further include transmitting a PRS measurement report including the at least one characteristic of each PRS of the plurality of PRS to an LMF network entity. In aspects, the LMF network entity is configured to generate, based on the PRS measurement report, beam management information.

In an additional aspect of the disclosure, a non-transitory computer-readable medium stores instructions that, when executed by a processor, cause the processor to perform operations including receiving, by a first network entity from a second network entity, a PRS measurement report, the measurement report including at least one characteristic of each PRS of a plurality of PRS, and generating, for each PRS of the plurality of PRSs, a PRS-assisted beam management message. In aspects, the PRS-assisted beam management message is configured to facilitate selection, by the second network entity, of a beam of a plurality of beams in a beam management procedure for communication between a base station and a UE.

In an additional aspect of the disclosure, an apparatus configured for wireless communication is disclosed. The apparatus includes means for measuring, by a UE, at least one characteristic of each PRS of a plurality of PRSs, the at least one characteristic including at least one LOS path-related measurement indicating whether a respective PRS includes one or more of a signal associated with an LOS path or a signal associated with an NLOS path. The apparatus further includes means for transmitting a PRS measurement report including the at least one characteristic of each PRS of the plurality of PRS to an LMF network entity. In aspects, the LMF network entity is configured to generate, based on the PRS measurement report, beam management information.

In an additional aspect of the disclosure, an apparatus configured for wireless communication is disclosed. The apparatus includes means for receiving, by a first network entity from a second network entity, a PRS measurement report, the measurement report including at least one characteristic of each PRS of a plurality of PRS, and means for generating, for each PRS of the plurality of PRSs, a PRS-assisted beam management message. In aspects, the PRS-assisted beam management message is configured to facilitate selection, by the second network entity, of a beam of a plurality of beams in a beam management procedure for communication between a base station and a UE.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
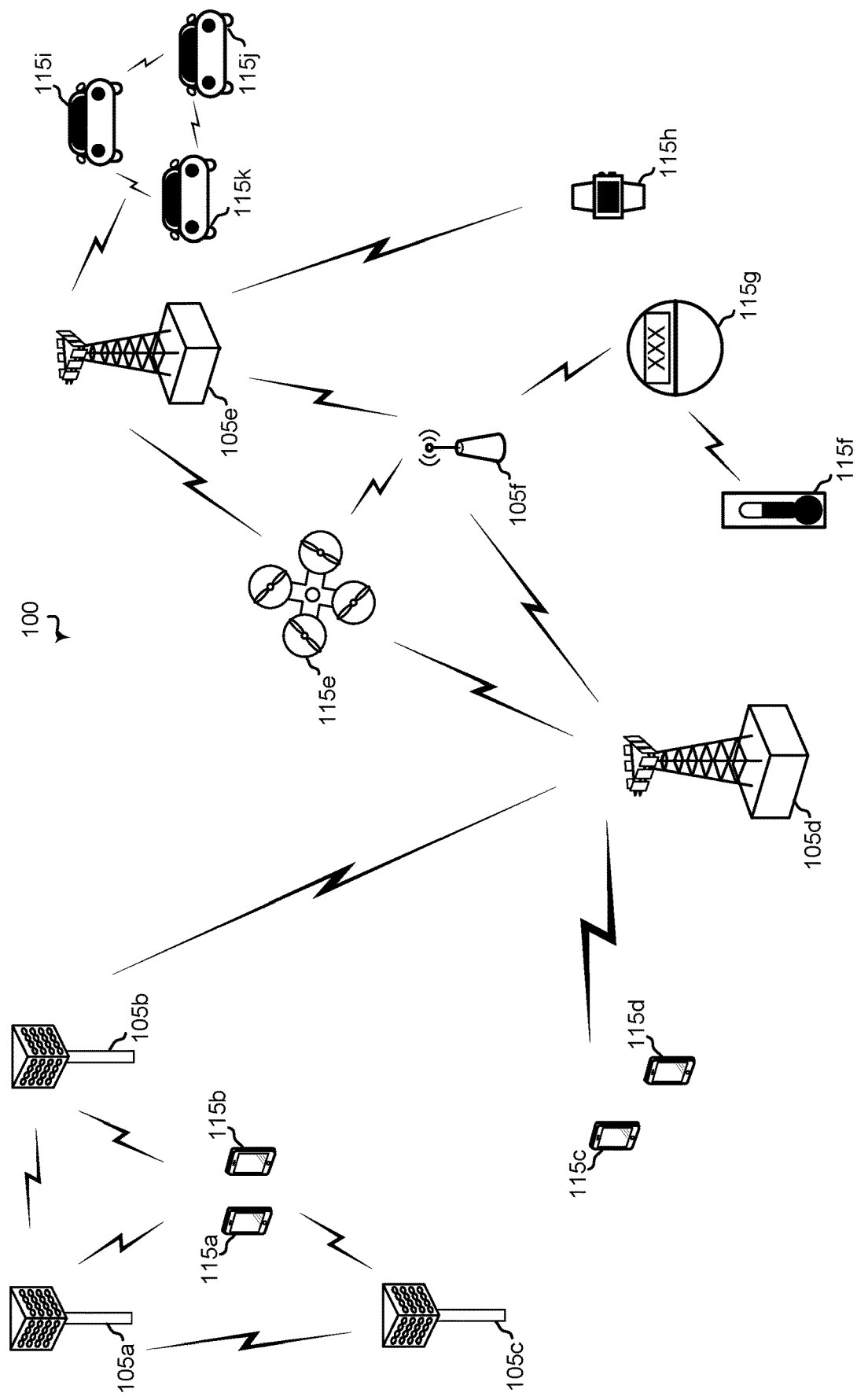
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail device or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspect. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
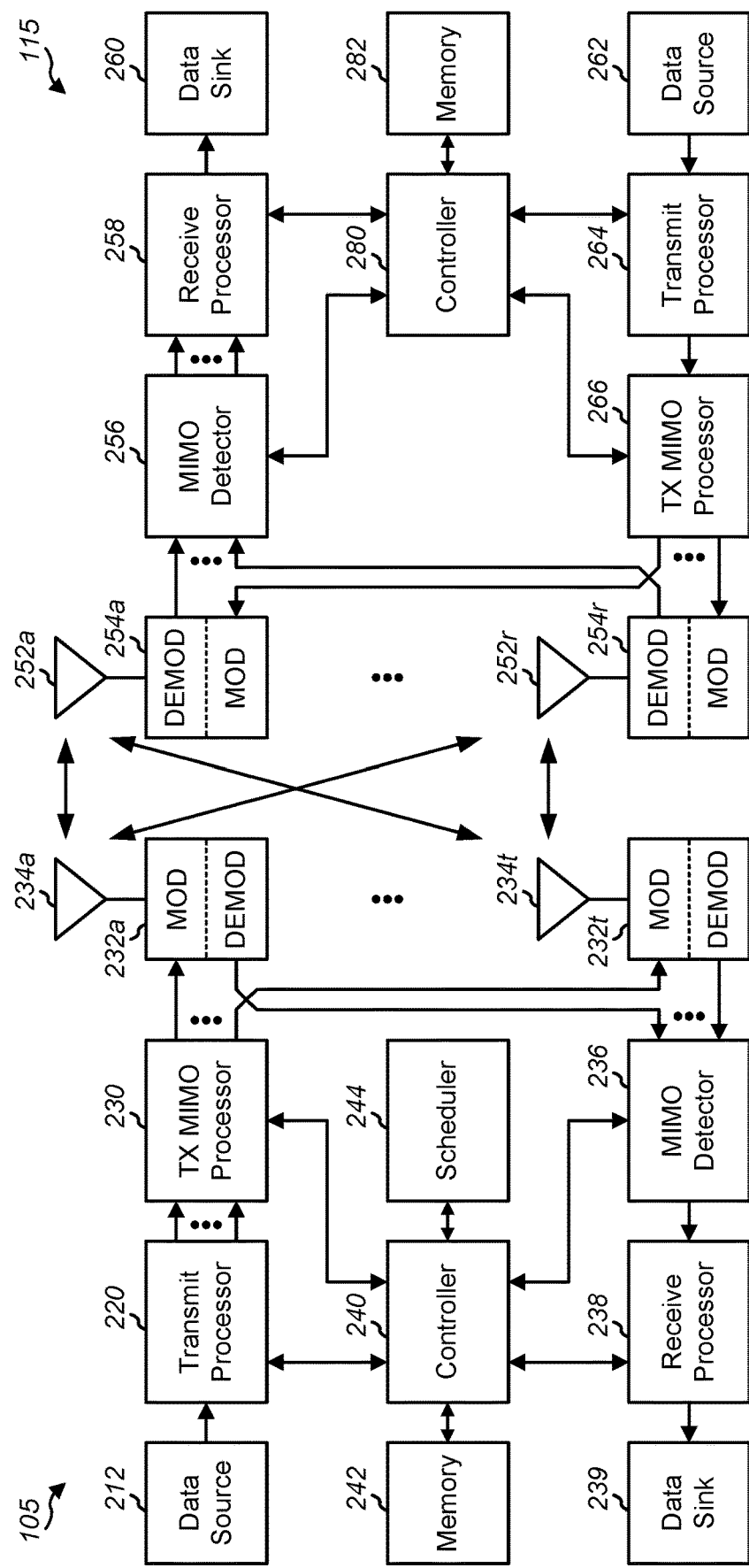
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 7-9, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Existing wireless communication systems rely on a position or location of user equipment (UE) within the network when providing communication services. The UE's location within the network may be determined using a variety of techniques. In one example positioning technique, which may be called a differential round-trip-time (RTT) technique, a UE's position may be determined based on a difference in the RTT between the UE and a number of base stations. In this RTT technique, the difference between the RTT from the UE to a first base station, and the RTT from the UE to a second base station may be used to determine the UE's location. In some examples, the RTT timing differences may be reported to a specific network entity (e.g., a location management function (LMF), which may determine the UE's location based on the reported timing differences.

In another positioning technique, called the time difference of arrival (TDOA) technique, a time difference between reference signals (e.g., positioning reference signals (PRS)) received from a plurality of base stations may be used to determine the UE's location. In this TDOA technique, a PRS may be received by the UE from each of the plurality of base stations, or from each transmission and reception point (TRP) of a cell. The UE measures the time offset between the arrival of each PRS from the different base stations. The time offset indicates a time difference of arrival of each PRS. This time difference of arrival of each PRS may be used, along with known locations of the base stations transmitting the PRSs, to determine the UE's location. In some examples, the timing measurements (e.g., the difference of arrivals for the different PRSs) may be reported to an LMF network entity, which may determine the UE's location and then report the UE's location to the UE.

In some particular examples of the above described positioning techniques, the timing differences of the signals (e.g., PRS signals or RTT signals) may be measured by measuring the time of arrival (TOA) of the earliest signal received by the UE for each PRS. For example, for each PRS, a single signal (e.g., single path) or multiple signals (e.g., multipath) may be detected. Each of the signals, whether a single signal in a PRS or multiple signals in a PRS, may indicate a path of the PRS to arrive at the UE. In some cases, the path of the PRS may be a line-of-sight (LOS) or may be a non-LOS (NLOS) path. In the positioning techniques discussed above, the measurement of the time difference may be performed based on an LOS path signal of the PRS. To that end, LOS detection may be performed on the PRS received by the UE to determine whether a signal, or signals, in the PRS is a LOS path signal or an NLOS path signal. Once LOS detection is performed, UE's location may be determined based on the LOS detection and known location information about the base stations transmitting the PRSs to the UE.

Various aspects of the present disclosure relate to techniques that enable PRS-assisted beam management. In particular, various aspects of the present disclosure provide techniques for a network entity to select a beam of a plurality of beams associated with a synchronization signal block (SSB) for communications between a base station and a UE based on the UE's location and LOS path detection results. In some implementations, the LOS path detection results may include an indication as to whether a PRS includes an LOS path signal and/or an NLOS, and/or a signal strength of the LOS path signal, as well as other information that a network entity (e.g., a UE or a base station) may use in a beam management procedure (e.g., to select a beam (e.g., during a cell discovery procedure)).

In some implementations, which may be referred to herein as a first UE-assisted positioning approach, the UE's location and the LOS path detection may be determined by an LMF network entity. In these implementations, the UE may receive a plurality of PRSs from different network entities, which herein may be referred to as anchors, and which may include base stations and/or other UEs. The UE may measure the PRSs received from the network entities and may report the measurements to the LMF network entity. In some implementations, the PRS measurements may include timing measurements (e.g., TOA, TOA offsets, etc.), signal strength measurements (e.g., reference signal received power (RSRP)), and/or signal angle measurements (e.g., angle of departure (AoD) and/or angle of arrival (AoA)). The PRS measurements may be associated with a particular network entity, or from a particular TRP, from which the PRS was received. The LMF may then perform LOS detection on each of the PRSs (or in some implementations the UE may perform the LOS detection and report it to the LMF), and may determine the UE's location based on the LOS detection results (e.g., may use TDOA or RTT-based techniques on the detected LOS paths of the PRSs). The UE's location may be reported to the UE and/or to other network entities (e.g., other anchors). In these implementations, the LMF may also generate a PRS-assisted beam management message, for each PRS, that includes: an indication as to whether the PRS includes one or more of: an LOS condition indicating one of four cases as described in more detail below and indicating whether the PRS includes an LOS path signal and/or an NLOS path signal, a confidence level indicating the probability that the LOS condition is correct, an identification of the LOS path signal, an identification of the NLOS path signal, a UE's location, a UE's distance to a particular anchor (e.g., the anchor to which the PRS-assisted messages are transmitted), an RSRP of the LOS path signal in the PRS, an RSRP of the NLOS path signal in the PRS, etc. In some implementations, an anchor, or serving base station, may use the information on the PRS-assisted beam management message to select a beam for communication with the UE.

In some other implementations, which may be referred to herein as a second UE-assisted positioning approach, the UE's location and the LOS path detection may be determined by an LMF network entity in a similar manner as in the first UE-assisted positioning approach. However, in the second UE-assisted positioning approach, the PRS measurements may be provided to the LMF by network entities other than the UE for which the location is to be determined. In these implementations, PRS measurement may be obtained by a plurality of network entities (e.g., anchors of the UE) based on uplink signals transmitted from the UE to the network entities reporting the PRS measurements. In some implementations, the uplink signals may include an uplink PRS transmitted by the UE, or may include other uplink transmissions. In these implementations, the PRS measurements may include similar measurements as in the first UE-assisted positioning approach. In implementations, the LMF may then perform LOS detection on each of the uplink PRSs (or in some implementations respective network entities may perform the LOS detection on each of the uplink PRSs and report it to the LMF), and may determine the UE's location based on the LOS detection results (e.g., may use TDOA or RTT-based techniques on the detected LOS paths of the uplink PRSs). The LMF may report the UE's location to the UE and/or to the other network entities (e.g., other anchors). In these implementations, the LMF may also generate a PRS-assisted beam management message, for each uplink PRS, that includes information as described in the PRS-assisted beam management message described in the first UE-assisted positioning approach. In implementations, the PRS-assisted beam management messages for each of the uplink PRSs may be transmitted to the UE (and/or to other network entities). In some implementations, an anchor, a serving base station, and/or the UE may use the information on the PRS-assisted beam management message to select a beam for communication between the UE and a base station (e.g., a base station associated with the uplink PRS upon which the beam selection is based).

In some implementations of the second UE-assisted positioning approach, the PRS measurements that may be provided to the LMF network entity may include PRS measurements of uplink PRSs transmitted from the UE to respective network entities, and may also include PRS measurements of downlink PRSs received by the UE from respective network entities. In some implementations, a PRS measurement report may be received by the LMF network entity from a network entity, other than the UE, and may include PRS measurements for an uplink PRS received by the network entity from the UE. In these implementations, the LMF network entity may also receive a PRS measurement report including PRS measurements for a downlink PRS received by the UE from the network entity. In these manner, the LMF may receive PRS measurement reports for a PRS link from both a UE and a network entity.

In yet other implementations, which may be referred to herein as a UE-based positioning approach, the UE's location and the LOS path detection may be determined by the UE itself. In these implementations, the UE may then report the UE's location, as well as LOS conditions for each PRS received by the UE, to the LMF and/or to other network entities. In these implementations, the UE may receive a plurality of PRSs from different network entities. In these implementations, the UE may measure the PRSs received from the network entities and may not report the measurements to the LMF network entity, but rather, may perform LOS detection on each of the PRS. The UE may then determine its own location based on the LOS detection results, as well as known locations of the different network entities from which the PRSs were received. The UE may perform beam management, such as selecting a beam for communication with another network entity, based on the UE's location and the LOS detection results, as described above with respect to the UE-assisted positioning approaches. In some implementations, the UE may report the UE's location, as well as LOS detection results to other network entities (e.g., other base stations and/or the LMF). The other network entities may use the UE's location and LOS detection results to perform beam management as described above.

Figure 3A:
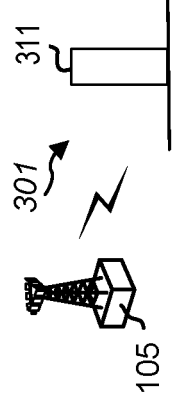
FIG. 3A is a timing diagram illustrating a first line-of-sight (LOS) condition in which a positioning reference signal (PRS) includes a single LOS path signal.

As described herein, performing LOS detection on a PRS may include determining an LOS condition of the PRS. An LOS condition, as will be described in more detail below, indicates a particular case regarding an LOS path for a PRS. FIGS. 3A-3D show timing diagrams illustrating four LOS condition cases according to one or more aspects of the present disclosure. FIG. 3A is a timing diagram illustrating a first LOS condition in which a PRS includes a single LOS path signal. The first LOS condition may also be referred to herein as LOS condition 1. As shown, PRS 300 may be transmitted from base station 105 to UE 115 and may include a single signal 310. Signal 310 may be determined to be an LOS path signal. For example, UE 115 or an LMF (not shown) may perform LOS detection on PRS 300 by applying LOS detection algorithms (e.g., a random sampling consensus (RANSAC)-based algorithm) to PRS 300 and may determine that PRS 300 includes signal 310 and no other signal. Furthermore, the LOS detection may determine that signal 310 is an LOS path signal. In implementations, performing LOS detection may also include determining a confidence level indicating the probability that the determination that signal 310 is an LOS path signal is correct. In some cases, performing LOS detection may also include determining an RSRP of signal 310.

Figure 3B:
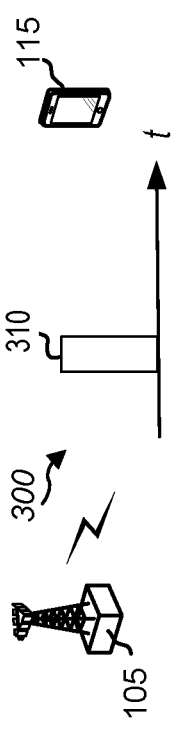
FIG. 3B is another timing diagram illustrating a second LOS condition in which a PRS includes a single non-LOS (NLOS) path signal.

FIG. 3B is a timing diagram illustrating a second LOS condition in which a PRS includes a single NLOS path signal. The second LOS condition may also be referred to herein as LOS condition 2. As shown, PRS 301 may be transmitted from base station 105 to UE 115 and may include a single signal 311. Signal 311 may be determined to be an NLOS path signal. For example, UE 115 or an LMF (not shown) may perform LOS detection on PRS 301 by applying LOS detection algorithms to PRS 301 and may determine that PRS 301 includes signal 311 and no other signal. Furthermore, the LOS detection may also determine that signal 311 is not an LOS path signal, or in other words that signal 311 is an NLOS path signal. In implementations, the LOS detection may also include determining a confidence level indicating the probability that the determination that signal 311 is an NLOS path signal is correct, and may also include determining an RSRP of signal 311.

Figure 3C:
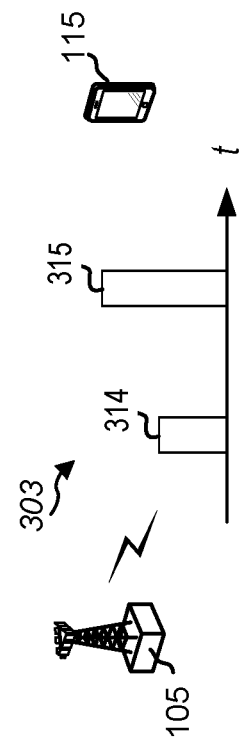
FIG. 3C is another timing diagram illustrating a third LOS condition in which a PRS includes an LOS path signal and an NLOS path signal of different signal strengths.

FIG. 3C is a timing diagram illustrating a third LOS condition in which a PRS includes an LOS path signal and an NLOS path signal of different signal strengths. The third LOS condition, which may also be referred to herein as LOS condition 3, indicates that the LOS path signal has a greater signal strength than the NLOS path signal. As shown, PRS 302 may be transmitted from base station 105 to UE 115 and may include signal 312 and signal 313. In implementations, UE 115 or an LMF (not shown) may perform LOS detection on PRS 302 by applying LOS detection algorithms to PRS 302 and may determine that signal 312 is an LOS path signal, and signal 313 is an NLOS path signal. In implementations, performing LOS detection may also include determining a confidence level indicating the probability that the determination that signal 312 is an LOS path signal and that signal 313 is an NLOS path signal is correct. In implementations, performing LOS detection on PRS 302 may also indicate that, based on an RSRP of signal 312 and an RSRP of signal 313, the signal strength of LOS path signal 312 is greater than the signal strength of NLOS path signal 313.

Figure 3D:
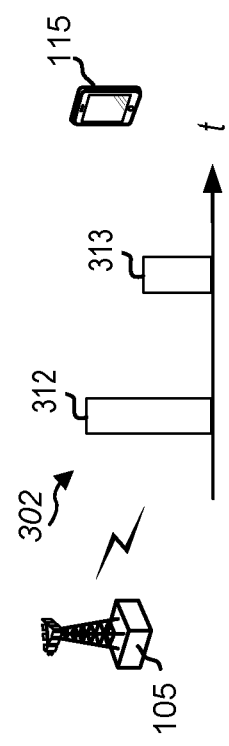
FIG. 3D is another timing diagram illustrating a fourth LOS condition in which a PRS includes an LOS path signal and an NLOS path signal of different signal strengths.

FIG. 3D is a timing diagram illustrating a fourth LOS condition in which a PRS includes an LOS path signal and an NLOS path signal of different signal strengths. The fourth LOS condition, which may also be referred to herein as LOS condition 4, indicates that the LOS path signal has a lower signal strength than the NLOS path signal. In some cases, LOS condition 4 may indicate that although the PRS includes an LOS path signal, the LOS path may have interference, such as a blockage. In this case, the signal strength of the LOS path signal may be even lower at higher carrier frequencies. As shown in FIG. 3D, PRS 303 may be transmitted from base station 105 to UE 115 and may include signal 314 and signal 315. In implementations, UE 115 or an LMF (not shown) may perform LOS detection on PRS 303 by applying LOS detection algorithms to PRS 303 and may determine that signal 314 is an LOS path signal, and signal 315 is an NLOS path signal. In implementations, performing LOS detection may also include determining a confidence level indicating the probability that the determination that signal 314 is an LOS path signal and that signal 315 is an NLOS path signal is correct. In implementations, performing LOS detection on PRS 303 may also indicate that, based on an RSRP of signal 314 and an RSRP of signal 315, the signal strength of LOS path signal 312 is lower than the signal strength of NLOS path signal 315.

Figure 4:
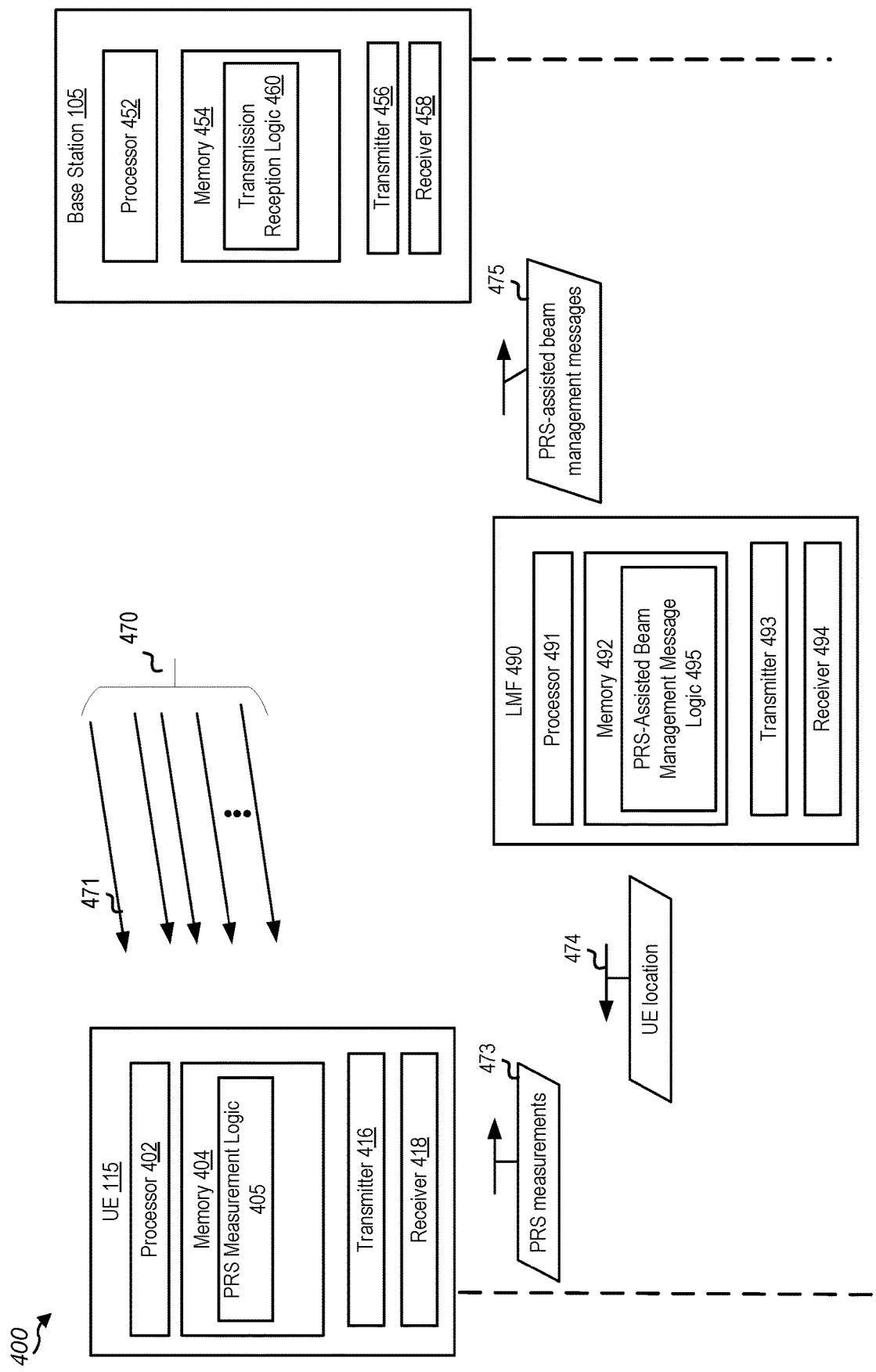
FIG. 4 is a block diagram of an example wireless communications system 400 that supports PRS-assisted beam management according to one or more aspects of the present disclosure.

FIG. 4 is a block diagram of an example wireless communications system 400 that supports PRS-assisted beam management according to one or more aspects of the present disclosure. In particular, wireless communications system 400 may implement aspects of a first UE-assisted positioning approach for PRS-assisted beam management in which a UE reports PRS measurements to an LMF network entity, and the LMF network entity performs LOS detection and UE's location detection.

In some examples, wireless communications system 400 may implement aspects of wireless network 100. Wireless communications system 400 includes UE 115, base station 105, and LMF network entity 490. Although one UE 115, one base station 105, and one LMF 490 are illustrated, in some other implementations, wireless communications system 400 may generally include multiple UEs 115, may include more than one base station 105, and may include more than one LMF network entity 490.

UE 115 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 418 (hereinafter referred to collectively as "receiver 418"). Processor 402 may be configured to execute instructions stored in memory 404 to perform the operations described herein. In some implementations, processor 402 includes or corresponds to one or more of receive processor 258, transmit processor 264, and controller 280, and memory 404 includes or corresponds to memory 282. Memory 404 includes or is configured to store PRS measurement logic 405.

Transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, base station 105 and LMF 490. In some implementations, transmitter 416 and receiver 418 may be integrated in one or more transceivers. Additionally or alternatively, transmitter 416 or receiver 418 may include or correspond to one or more components of UE 115 described with reference to FIG. 2.

In aspects, PRS measurement logic 405 may be configured to perform PRS measurements on each PRS received by UE 115. In aspects, PRS measurements may include timing measurements (e.g., TOA, TOA offsets, etc.), signal strength measurements (e.g., RSRP), and/or signal angle measurements (e.g., AoD and/or AoA) of each PRS received by UE 115. In aspects, performing PRS measurements may also include performing LOS detection on the PRSs received by UE 115. Furthermore, PRS measurement logic 405 may be configured to generate a PRS measurement report including the PRS measurements for each PRS, and to transmit the report for each PRS to other network entities, including base station and LMF network entity 490.

Base station 105 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). Processor 452 may be configured to execute instructions stored in memory 454 to perform the operations described herein. In some implementations, processor 452 includes or corresponds to one or more of receive processor 238, transmit processor 220, and controller 240, and memory 454 includes or corresponds to memory 242. Memory 454 includes or is configured to store transmission/reception logic 460.

Transmitter 456 is configured to transmit reference signals, synchronization signals, control information and data to one or more other devices, and receiver 458 is configured to receive reference signals, control information and data from one or more other devices. For example, transmitter 456 may transmit signaling, control information and data to, and receiver 458 may receive signaling, control information and data from, UE 115 and LMF network entity 490. In some implementations, transmitter 456 and receiver 458 may be integrated in one or more transceivers. Additionally or alternatively, transmitter 456 or receiver 458 may include or correspond to one or more components of base station 105 described with reference to FIG. 2.

LMF network entity 490 may include a variety of components (such as structural, hardware components) used for carrying out one or more functions described herein. For example, these components may include one or more processors 491 (hereinafter referred to collectively as "processor 491"), one or more memory devices 492 (hereinafter referred to collectively as "memory 492"), one or more transmitters 493 (hereinafter referred to collectively as "transmitter 493"), and one or more receivers 494 (hereinafter referred to collectively as "receiver 494"). Processor 491 may be configured to execute instructions stored in memory 492 to perform the operations described herein. Memory 492 includes or is configured to store PRS-assisted beam management message generation logic 495.

Transmitter 493 is configured to transmit reference signals, control information and data to one or more other devices, and receiver 494 is configured to receive references signals, synchronization signals, control information and data from one or more other devices. For example, transmitter 493 may transmit signaling, control information and data to, and receiver 494 may receive signaling, control information and data from, base station 105 and/or UE 115. In some implementations, transmitter 493 and receiver 494 may be integrated in one or more transceivers.

In some implementations, wireless communications system 400 implements a 5G NR network. For example, wireless communications system 400 may include multiple 5G-capable UEs 115 and multiple 5G-capable base stations 105, such as UEs and base stations configured to operate in accordance with a 5G NR network protocol such as that defined by the 3GPP.

During operation of wireless communications system 400, UE 115 receives a plurality of PRSs 470 from a plurality of network entities. In aspects, each PRS of the plurality of PRSs 470 may include a PRS from each network element of the plurality of network entities. In aspects, some PRSs of the plurality of PRSs 470 may be transmitted from a TRP of a cell. For example, the plurality of PRSs 470 may include PRS 471. In this example, PRS 471 may be transmitted from a TRP of a cell associated with base station 105. In some examples, some PRSs of the plurality of PRSs 470 may be transmitted from neighboring base stations, or from other UEs. In such examples, the neighboring base stations and other UEs may be referred to as anchors.

In aspects, UE 115 may perform PRS measurements on each PRS of the plurality of PRSs 470. In aspects, UE 115 may measure at least one characteristic of each PRS. The characteristics of the PRS that may be measured by UE 115 may include timing measurements. For example, where a TDOA technique may be used to determine the UE's location, the UE may measure a reference signal time difference (RSTD) for each received PRS. Where an RTT technique is used to determine the UE's location, the UE may measure a transmitter-receiver time difference to determine an RTT for each PRS. In these aspects implementing the RTT technique, a network entity from which a respective PRS is received may also measure a transmitter-receiver time difference on an uplink PRS received from UE 115. The transmitter-receiver time difference measured by UE 115 and the transmitter-receiver time difference measured by the network entity may be reported to the LMF network entity, and the LMF network entity may determine a UE's location based on the reported transmitter-receiver time differences. In aspects, the PRS measurements may also include measuring an RSRP of each PRS. In some aspects, measuring the RSRP of each PRS may also include measuring the RSRP of each path signal received in the PRS. For example, where multipath PRS is received including more than one path signal, UE 115 may measure the RSRP of each path signal. In some aspects, the PRS measurements may also include measuring angle measurements of each PRS. In some aspects, measuring the angle measurements of each PRS may also include measuring the AoA and/or AoD of each path signal received in the PRS.

In some aspects, the PRS measurements for each PRS may also include LOS path measurements. The LOS path measurements to be included in the PRS measurement for a respective PRS may include a report for each path signal detected in the PRS. In some cases, as discussed above with respect to FIGS. 3A-3D, a PRS may include one or more path signals. In the case of a multipath PRS (e.g., PRS LOS conditions 3 and 4), UE 115 may include PRS measurements for each of the multiple paths of the multipath PRS. In the case of a single path PRS (e.g., PRS LOS conditions 1 and 2), UE 115 may include PRS measurements for single path signal of the PRS.

In some optional aspects, UE 115 may also perform LOS detection on each PRS of the plurality of PRSs 470. For example, as described above, UE 115 may apply LOS detection algorithms to each PRS of the plurality of PRSs 470 to determine whether each PRS includes an LOS signal and/or an NLOS signal. In aspects, the LOS detection, in addition with PRS signal strength measurements, may enable UE 115 to identify which LOS condition (e.g., which of LOS conditions 1-4) each PRS is on. In some aspects, an indicator of the LOS condition of each PRS may be generated, and may be added to the PRS measurement report of each respective PRS that is sent to LMF network entity 490. In these implementations, using a bit-level indicator may result in a lower overhead because multiple reports may not have to be generated and transmitted to LMF network entity 490. Instead, the LOS condition indicator may inform LMF network entity 490, which condition the PRS is on.

In aspects, UE 115 may generate a PRS measurement report for one or more PRS of the plurality of PRSs 470. For example, UE 115 may generate a PRS measurement report for a subset of the plurality of PRSs 470. In some aspects, the PRS measurement report for the one or more PRS may include the PRS measurements and one or more measurements based on one or more paths measured by UE 115 and described above.

During operation of wireless communications system 400, UE 115 may transmit message 473 to LMF network entity 490. Message 473 may include the PRS measurement reports generated by UE 115. In some aspects, the PRS measurement reports transmitted to LMF network entity 490 from UE 115 may include at least one PRS measurement report for each PRS of the plurality of PRSs 470. In some other aspects, the PRS measurement reports transmitted to LMF network entity 490 from UE 115 may not include a PRS measurement report for each PRS of the plurality of PRSs 470. In such aspects, the PRS measurement reports may include PRS measurement reports for a subset of the plurality of PRSs 470. For example, where UE 115 may have performed LOS detection on the PRSs of the plurality of PRSs 470, the subset of the plurality of PRSs 470 for which at least one PRS measurement report is transmitted to LMF network entity 490 may include only PRSs which are determined to include an LOS path signal. In other examples, the subset of the plurality of PRSs 470 for which at least one PRS measurement report is transmitted to LMF network entity 490 may include PRSs from particular TRPs from particular cells. In aspects, the particular TRPs and/or the particular cells may be identified by prior configuration. For example, LMF network entity 490 may send a message to UE 115 (e.g., as part of an LTE positioning protocol (LPP)) indicating to UE 115 which TRPs from which cells the UE is to report PRS measurements.

In some aspects, as part of the LPP protocol, such as in assistance data exchange, UE 115 and LMF network entity 490 may determine whether UE 115 and LMF network entity 490 both support PRS-assisted beam management according to aspects of the present disclosure. For example, UE 115 may send an indication to LMF network entity 490 indicating that UE 115 supports PRS-assisted beam management. Similarly, LMF network entity 490 may send an indication to UE 115 indicating that LMF network entity 490 supports PRS-assisted beam management. Based on the indication that LMF network entity 490 supports PRS-assisted beam management, UE 115 may transmit the PRS measurement reports for each received PRS to LMF network entity 490. On the other hand, where no indication that LMF network entity 490 supports PRS-assisted beam management is received by UE 115, or where UE 115 receives an indication (e.g., from LMF network entity 490) that LMF network entity 490 does not support PRS-assisted beam management, UE 115 may not transmit a complete PRS measurement report for each received PRS to LMF network entity 490. For example, UE 115 may transmit a PRS measurement report for each received PRS to LMF network entity 490, but the PRS measurement report may not include additional information for PRS-assisted beam management (e.g., LOS condition indication, RSRP, angle measurements, etc.).

In aspects, LMF network entity 490 receives, from UE 115, the PRS measurement reports for each PRS received by UE 115, and may use the PRS measurement reports to determine UE 115's location. In aspects, as noted above, LMF network entity 490 may analyze the PRS measurement reports, such as the timing measurements in the PRS reports, for each PRS and may determine a UE's location based on the timing measurements. In aspects, LMF network entity 490 may also determine UE 115's location based on known locations of the network entities (e.g., anchors and serving base station). For example, LMF network entity 490 may know the location of each base station and UE in the network. Knowing the location of each base station and UE in the network associated with each PRS for which a PRS measurement report is received from UE 115, LMF network entity 490 may determine UE 115's location based on the timing measurements in the PRS measurement reports. In some aspects, LMF network entity 490 may determine UE 115's location additionally based on an LOS condition of each PRS associated with the received PRS measurement reports.

In some aspects, for example where the PRS measurement reports received from UE 115 do not include an indication of an LOS condition (e.g., where UE 115 did not perform LOS detection), LMF network entity 490 may perform LOS detection on each PRS for which a PRS measurement report is received from UE 115. In these aspects, LMF network entity 490 may apply LOS detection algorithms to each PRS for which a PRS measurement report is received from UE 115 to determine whether each respective PRS includes an LOS signal and/or an NLOS signal. In aspects, the LOS detection, in addition with PRS signal strength measurements for the respective PRS in the PRS measurement report, may enable LMF network entity 490 to identify which LOS condition (e.g., which of LOS conditions 1-4) each PRS is on. For example, LMF network entity 490 may determine, based on a PRS measurement report of a respective PRS, that the respective PRS includes single LOS path signal (e.g., LOS condition 1), a single NLOS path signal (e.g., LOS condition 2), an LOS path signal and an NLOS path signal, where the LOS path signal has greater signal strength than the NLOS path signal (e.g., LOS condition 3), or an LOS path signal and an NLOS path signal, where the LOS path signal has lower signal strength than the NLOS path signal (e.g., LOS condition 4). In aspects, LMF network entity 490 may also determine a confidence level indicating a probability that the LOS condition results, for a respective PRS, are correct.

In some aspects, the LOS condition may be used, as will be described in more detail below, by a network entity (e.g., base station 105) to select a beam in a beam management procedure for communication with the UE. In these aspects, the LOS condition may indicate to the network entity attempting to select a beam whether an LOS path exist, and the condition of the LOS path with UE 115. For example, where the LOS condition for a particular PRS is LOS condition 4 (e.g., the NLOS path signal has a higher signal strength that the LOS path signal), the network entity may derive that a blockage might exist in the LOS path. Consequently, the network entity may determine that throughput may not be sufficient if a beam associated with the TRP from which the PRS was transmitted is selected. Additionally, while the signal strength of the LOS path signal may indicate a sufficient signal strength for communication in the frequency range (FR) where the PRS was transmitted despite the blockage, the network entity may derive that the signal interference may get worse in a higher FR. This is of utmost importance, as in higher FRs, e.g., FRs in which an LOS path is preferred or in which beam measurement is required for beam selection, a PRS in LOS condition 4 may indicate an unsuitable beam.

In aspects, LMF network entity 490 may also determine, for each network entity associated with a respective PRS for which a PRS measurement report is received from UE 115, a distance between UE 115 and the respective network entity. In aspects, UE 115's location and the distance between UE 115 and the respective network entity may facilitate the respective network entity scheduling a synchronization signal in an SSB for cell discovery by UE 115.

In aspects, LMF network entity 490 may generate a PRS-assisted beam management message for each PRS for which a PRS measurement report was received from UE 115. In aspects, each PRS-assisted beam management message may include an LOS condition of the respective PRS, the LOS condition confidence level, the distance between the UE and the network entity associated with the respective PRS, the RSRP of the LOS signal in the respective PRS, and/or the RSRP of the NLOS signal in the respective PRS.

In aspects, a respective PRS for which a PRS measurement report was received from UE 115 may be a PRS from a network entity that is not the serving base station of UE 115. In this case, LMF network entity 490 may further include in the PRS-assisted beam management message for the respective PRS, a cell identification (ID), a PRS ID, and a TRP associated with the PRS. In some embodiments, this information may be relayed to UE 115 by the serving base station after receiving it from LMF network entity 490 (e.g., via control message in a control channel, and/or via another base station, such as using an X2 or an Xn interface).

During operation, LMF network entity 490 may transmit message 474 to UE 115. Message 474 may include the UE's location determined by LMF network entity 490.

During operation, LMF network entity 490 may transmit message 475 to UE 115. Message 475 may include the PRS-assisted beam management message for one or more PRS for which a PRS measurement report was received from UE 115 to base station 105. In aspects, the PRS-assisted beam management messages may also be transmitted to other network entities, such as other base stations (e.g., neighboring base stations) and/or other UEs. In aspects, base station 105 may be a serving base station of UE 115, or may be a base station to which UE 115 may be intended to connect, such as via handover, redirection, etc.

In aspects, LMF network entity 490 may transmit the PRS-assisted beam management messages to base station 105 as part of an NR positioning protocol A (NRPPA). In these aspects, base station 105 may send a request to LMF network entity 490 requesting the PRS-assisted beam management messages. In such aspects, LMF network entity 490 transmits the PRS-assisted beam management messages to base station 105 in response to the request from base station 105.

In aspects, base station 105 may receive the PRS-assisted beam management messages and may perform beam management procedures using the PRS-assisted beam management messages. In some aspects, a PRS-assisted beam management message for one or more PRS associated with one or more TRP of base station 105 may be received. For example, a PRS-assisted beam management message for one or more PRS resources associated with TRPs within only the serving cell may be received. In aspects, base station 105 may select a beam for communication with UE 115 based on the LOS condition of the PRS, or PRSs, associated with base station and the LOS condition confidence level, based on UE 115's location, based on the distance between UE 115 and base station 105, and/or based on the RSRP of the LOS path signal of the PRS. In an example, base station may decide to select a beam based on the PRS-assisted beam management message for a PRS. In this example, base station 105 may select a beam that is quasi-colocated (QCLed) with the PRS, and in the same frequency band. In this example, the beam selected by base station 105 for communication with UE 115 may not be the same beam over which the PRS was transmitted, but it may be QCLed, which may provide sufficient communication performance.

In some aspects, base station 105 may select a beam for communication with UE 115 in a band that is in a different FR than the FR of the band in which the PRS was transmitted to UE 115. For example, the PRS may be transmitted to UE 115 in FR1, and the base station 105 may select a beam for communication with UE 115 in FR2 or higher. In another example, the PRS may be transmitted to UE 115 in FR2x, and the base station 105 may select a beam for communication with UE 115 in FR2. In this cross-band PRS-assisted beam management, the LOS condition indication, as well as the RSRP of the PRS, reported in the PRS-assisted beam management message may be especially important. As discussed above, the LOS condition of a PRS may indicate that there might be a blockage in the LOS path (e.g., LOS condition 4). This LOS condition 4 may indicate to base station 105, that the signal strength of the LOS path signal may be even lower in the higher FRs. In this example, the RSRP of the PRS may also indicate that the signal strength of the PRS is sufficiently high in the FR1, which may be the FR in which the PRS was transmitted. The base station may determine that even in a higher FR, the signal strength may be sufficiently high to support communication. As such, base station may select a beam associated with the TRP from which the PRS having the LOS condition 4 was transmitted. On the other hand, the RSRP of the PRS may also indicate that the signal strength of the PRS is sufficiently high in the FR1, but base station 105 may determine that in a higher FR, the signal strength may not be sufficiently high to support communication. As such, base station may not select a beam associated with the TRP from which the PRS having the LOS condition 4 was transmitted.

Figure 5:
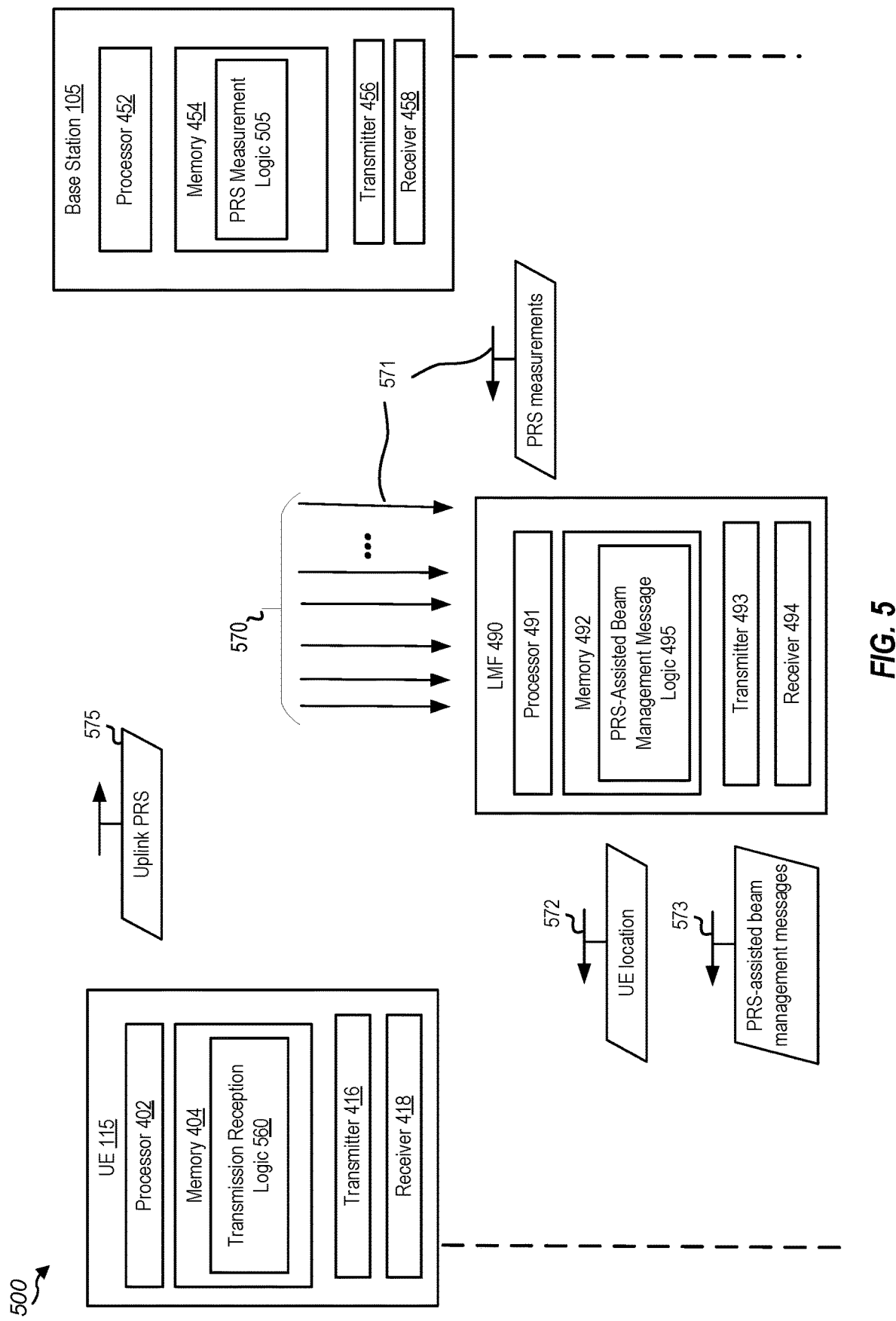
FIG. 5 is a block diagram of an example wireless communications system that supports PRS-assisted beam management according to one or more aspects of the present disclosure.

FIG. 5 is a block diagram of an example wireless communications system 500 that supports PRS-assisted beam management according to one or more aspects of the present disclosure. In particular, wireless communications system 500 may implement aspects of a second UE-assisted positioning approach for PRS-assisted beam management in which PRS measurements are reported to an LMF network entity from network entities other than the UE, and the LMF network entity performs LOS detection and the UE's location detection.

In some examples, wireless communications system 500 include UE 115, base station 105, and LMF network entity 490 as described with respect to wireless communication system 400 of FIG. 4. For the sake of brevity, the various components of wireless communications system 500 are not described again, but it will be appreciated that the components of wireless communications system 500 are similar to the components of wireless communications system 400, albeit configured to implement aspects of the second UE-assisted positioning approach for PRS-assisted beam management in accordance with the present disclosure.

During operation of wireless communication system 500, UE 115 transmits an uplink PRS 575 to base station 105. In some aspects, UE 115 may also transmit an uplink PRS to other network entities. In these aspects, UE 115 transmits a plurality of uplink PRS, each to a different network entity of a plurality of network entities including base station 105. In some aspects, each uplink PRS may be transmitted to a different TRP, each TRP associated with a cell. In some aspects, more than one TRP may be associated with the same cell.

In aspects, UE 115 may also receive a plurality of downlink PRSs, each downlink PRS received from a network entity to which UE 115 transmits an uplink PRS.

In aspects, each of the network entities receiving the uplink PRS from UE 115 may perform uplink PRS measurements. For example, base station 105 may perform PRS measurements on uplink PRS 575 received from UE 115. In some aspects, UE 115 may similarly perform downlink PRS measurements on the downlink PRSs received from the network entities. For example, UE 115 may perform downlink PRS measurements on a downlink PRS received from base station 105. In aspects, PRS measurement (e.g., uplink PRS measurements and/downlink PRS measurements) may include measurements of at least one characteristic of the uplink PRS and/or the downlink PRS. The characteristics of the uplink PRS that may be measured by the network entities (e.g., including base station 105) may include timing measurements. For example, where a TDOA technique may be used to determine the UE's location, the network entities (e.g., including base station 105) may measure a reference signal time difference (RSTD) for the respectively received uplink PRS. Where an RTT technique is used to determine the UE's location, the network entities (e.g., including base station 105) may measure a transmitter-receiver time difference to determine an RTT for the respectively received uplink PRS. Additionally, in this RTT technique, UE 115 may measure a transmitter-receiver time difference to determine an RTT for the downlink PRS received from each respective network entity.

In aspects, the PRS measurements may also include measuring an RSRP of the uplink PRS respective received by a network entity and/or the downlink PRSs received by UE 115. In some aspects, measuring the RSRP of the uplink PRS and/or the downlink PRSs may also include measuring the RSRP of each path signal received in the uplink PRS and/or downlink PRS. For example, where a multipath PRS (e.g., uplink PRS or downlink PRS) is received including more than one path signal, the respective network entity or the UE may measure the RSRP of each path signal. In some aspects, the PRS measurements may also include measuring angle measurements of the respectively received uplink PRS and/or downlink PRS. In some aspects, measuring the angle measurements of the respectively received uplink PRS and/or downlink PRS may include measuring the AoA and/or AoD of each path signal received in the respectively received uplink PRS and/or downlink PRS.

In some aspects, the PRS measurements for the uplink PRS and/or downlink PRS may also include LOS path measurements. The LOS path measurements to be included in a PRS measurement report for the uplink PRS and/or a PRS measurement report for the downlink PRS may include a report for each path signal detected in the uplink PRS and/or downlink PRS. In some cases, as discussed above with respect to FIGS. 3A-3D, a PRS (e.g., an uplink PRS and/or a downlink PRS) may include one or more path signals. In the case of a multipath PRS (e.g., PRS LOS conditions 3 and 4), UE 115 may include PRS measurements for each of the multiple paths of the multipath PRS. In the case of a single path PRS (e.g., PRS LOS conditions 1 and 2), a network entity may include PRS measurements for the single path signal of the PRS.

In some optional aspects, the network entities (e.g., including base station 105) may also perform LOS detection on the respectively received uplink PRS. For example, the network entities (e.g., including base station 105) may apply LOS detection algorithms to the uplink PRS to determine whether the uplink PRS includes an LOS signal and/or an NLOS signal. In aspects, the LOS detection, in addition with PRS signal strength measurements, may enable the network entities (e.g., including base station 105) to identify which LOS condition (e.g., which of LOS conditions 1-4) the respectively received uplink PRS is on.

In aspects, each network entity (e.g., including base station 105) may generate a PRS measurement report for the respectively received uplink PRS. In some aspects, the PRS measurement report for the uplink PRS generated by each network entity may include the PRS measurements and the LOS path measurements measured by each network entity and described above. In some aspects, UE 115 may generate a PRS measurement report for one or more downlink PRS received from the plurality of network entities. In some aspects, the PRS measurement reports generated by UE 115 may include the PRS measurements and the LOS path measurements measured by UE 115 for the one or more PRS received from the network entities and described above.

During operation of wireless communication system 500, LMF network entity 490 receives a plurality of PRS measurement reports 570 from the plurality of network entities. In aspects, a PRS measurement report is received from each network entity of the plurality of network entities. The PRS measurement report received from each network entity includes the PRS measurements and LOS path measurements for the uplink PRS respectively received from UE 115. For example, the plurality of PRS measurement reports 570 includes PRS measurement report 571 transmitted from base station 105 to LMF network entity 490. In some aspects, LMF network entity 490 may also receive a plurality of PRS measurement reports from UE 115.

In aspects, LMF network entity 490 may use the PRS measurement reports (e.g., the PRS measurement reports received from the network entities and the PRS measurement reports received from UE 115) to determine UE 115's location. In aspects, as noted above, LMF network entity 490 may analyze the PRS measurement reports, such as the timing measurements in the PRS measurement reports, for the uplink PRS respectively received by each network entity and for the downlink PRSs received by UE 115, and may determine a UE's location based on the timing measurements. In aspects, LMF network entity 490 may also determine UE 115's location based on known locations of the network entities (e.g., anchors and serving base station). For example, LMF network entity 490 may know the location of each base station and UE in the network. Knowing the location of each base station and UE in the network from which a respective PRS measurement report is received, LMF network entity 490 may determine UE 115's location based on the timing measurements in the PRS measurement reports. In some aspects, LMF network entity 490 may determine UE 115's location additionally based on an LOS condition of the uplink PRS respectively received by each network entity, and/or the LOS condition of the downlink PRSs received by UE 115.

In some aspects, LMF network entity 490 may perform LOS detection on the uplink PRS respectively received by each network entity. In these aspects, LMF network entity 490 may apply LOS detection algorithms to the uplink PRS respectively received by each network entity to determine whether each respectively received uplink PRS includes an LOS signal and/or an NLOS signal. In aspects, the LOS detection algorithms may include LOS detection algorithms that are based on one measurement (e.g., based on IQ samples) and/or LOS detection algorithms that are based on multiple measurements (e.g., outlier rejection algorithms). In aspects, the LOS detection, in addition with PRS signal strength measurements for the respectively received uplink PRS in the PRS measurement report, may enable LMF network entity 490 to identify which LOS condition (e.g., which of LOS conditions 1-4) each respectively received uplink PRS is on. For example, LMF network entity 490 may determine, based on a PRS measurement report for uplink PRS 575 received by base station 105, that the uplink PRS 575 includes single LOS path signal (e.g., LOS condition 1), a single NLOS path signal (e.g., LOS condition 2), an LOS path signal and an NLOS path signal, where the LOS path signal has greater signal strength than the NLOS path signal (e.g., LOS condition 3), or an LOS path signal and an NLOS path signal, where the LOS path signal has lower signal strength than the NLOS path signal (e.g., LOS condition 4). In aspects, LMF network entity 490 may also determine a confidence level indicating a probability that the LOS condition results, for uplink PRS 575, are correct. In some aspects, LMF network entity 490 may also perform LOS detection on the downlink PRSs received by UE 115 from the network entities.

In aspects, LMF network entity 490 may generate a PRS-assisted beam management message for one or more uplink PRS respectively received by network entity of the plurality of network entities. In aspects, each PRS-assisted beam management message may include an LOS condition of the respectively received uplink PRS, the LOS condition confidence level, a distance between the UE and the network entity associated with the respectively received uplink PRS, the RSRP of the LOS path signal in the respectively received uplink PRS, and/or the RSRP of the NLOS path signal in the respectively received uplink PRS. In aspects, LMF network entity 490 may also generate a PRS-assisted beam management message for one or more downlink PRS received by UE 115 from the plurality of network entities.

During operation, LMF network entity 490 may transmit message 572 to UE 115. Message 572 may include the UE's location determined by LMF network entity 490.

During operation, LMF network entity 490 may transmit message 573 to UE 115. Message 573 may include the PRS-assisted beam management message for one or more uplink PRS received by the plurality of network entities (e.g., including base station 105) from UE 115. In some aspects, message 573 may also include the PRS-assisted beam management message for one or more downlink PRS received by UE 115 from the plurality of network entities.

In aspects, LMF network entity 490 may transmit the PRS-assisted beam management messages to UE 115 as part of the LPP. In these aspects, UE 115 may send a request to LMF network entity 490 requesting the PRS-assisted beam management messages. In such aspects, LMF network entity 490 transmits the PRS-assisted beam management messages to UE 115 in response to the request from UE 115.

In aspects, UE 115 may receive the PRS-assisted beam management messages and may perform beam management procedures using the PRS-assisted beam management messages. In some aspects, UE may perform beam management by selecting a beam for communication with a network entity based on the information in the PRS-assisted beam management message related to the uplink PRS received by the network entity from UE 115. In aspects, UE 115 may select a beam for communication with a network entity based on the LOS condition of the uplink PRS, or uplink PRSs, received by the network entity from UE 115, and the LOS condition confidence level, based on UE 115's location, based on the distance between UE 115 and the network entity, and/or based on the RSRP of the LOS path signal of the uplink PRS received by the network entity. In an example, UE 115 may decide to select a beam in the same frequency band as the frequency band in which the uplink PRS was transmitted to the network entity associated with the beam. In this example, the selected beam may QCLed with the uplink PRS, and in the same frequency band. In aspects, this frequency band may be FR1.

In some aspects, the beam management procedure may include determining whether to select a beam in a band that is in a different FR than the FR of the band in which the uplink PRS was transmitted to the network entity (e.g., FR1) and/or the band in which the downlink PRS was received by UE 115. In these aspects, UE 115 may decide whether to perform the cross-band beam selection based on the PRS-assisted beam management messages related to the uplink PRS received by the network entities from UE 115 and/or based on the PRS-assisted beam management messages related to the downlink PRS received by UE 115 from the network entities, as described above.

Figure 6:
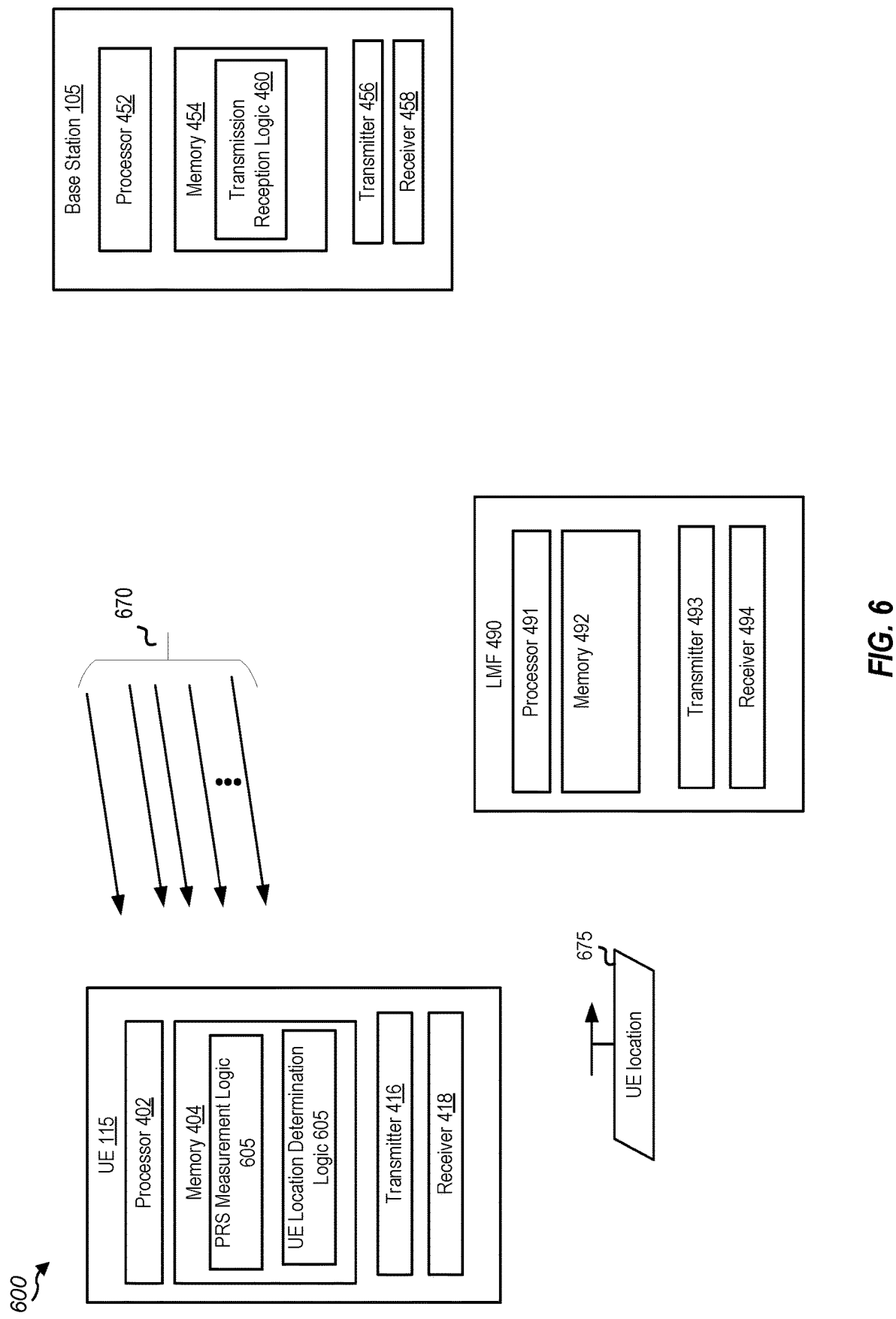
FIG. 6 is a block diagram of another example wireless communications system that supports PRS-assisted beam management according to one or more aspects of the present disclosure

FIG. 6 is a block diagram of an example wireless communications system 600 that supports PRS-assisted beam management according to one or more aspects of the present disclosure. In particular, wireless communications system 600 may implement aspects of a UE-based positioning approach for PRS-assisted beam management in which a UE performs PRS measurements, LOS detection and the UE's location detection. In aspects, the UE does not report the PRS measurements to another network entity.

In some examples, wireless communications system 600 include UE 115, base station 105, and LMF network entity 490 as described with respect to wireless communication systems 400 and 500 of FIGS. 4 and 5, respectively. For the sake of brevity, the various components of wireless communications system 600 are not described again, but it will be appreciated that the components of wireless communications system 600 are similar to the components of wireless communications systems 400 and 500, albeit configured to implement aspects of the UE-based positioning approach for PRS-assisted beam management in accordance with the present disclosure.

During operation of wireless communication system 600, UE 115 receives a plurality of PRSs 670 from a plurality of network entities. In aspects, each PRS of the plurality of PRSs 670 may include a PRS from each network element of the plurality of network entities. In aspects, operations for receiving the plurality of PRSs 670 may be similar to operations for receiving the plurality of PRSs 470 described above with respect to FIG. 4.

In aspects, UE 115 may perform PRS measurements on each PRS of the plurality of PRSs 670. In aspects, UE 115 may measure at least one characteristic of each PRS. The characteristics of the PRS that may be measured by UE 115 may include timing measurements. For example, where a TDOA technique may be used to determine the UE's location, the UE may measure a reference signal time difference (RSTD) for each received PRS. Where an RTT technique is used to determine the UE's location, the UE may measure a transmitter-receiver time difference to determine an RTT for each PRS. In aspects, the PRS measurements may also include measuring an RSRP of each PRS. In some aspects, measuring the RSRP of each PRS may also include measuring the RSRP of each path signal received in the PRS. For example, where multipath PRS is received including more than one path signal, UE 115 may measure the RSRP of each path signal. In some aspects, the PRS measurements may also include measuring angle measurements of the respectively received uplink PRS. In some aspects, measuring the angle measurements of the respectively received uplink PRS may include measuring the AoA and/or AoD of each path signal received in the respectively received uplink PRS.

In some aspects, the PRS measurements for each PRS may also include LOS path measurements. The LOS path measurements to be included in the PRS measurement for a respective PRS may include a report for each path signal detected in the PRS. In some cases, as discussed above with respect to FIGS. 3A-3D, a PRS may include one or more path signals. In the case of a multipath PRS (e.g., PRS LOS conditions 3 and 4), UE 115 may include PRS measurements for each of the multiple paths of the multipath PRS. In the case of a single path PRS (e.g., PRS LOS conditions 1 and 2), UE 115 may include PRS measurements for single path signal of the PRS.

In aspects, rather than reporting the PRS measurements to LMF network entity 490 for LOS detection and UE's location detection, UE 115 performs LOS detection and determines its own location based on the PRS measurements. In addition, in these aspects, UE 115 is aware of the location of each network entity form which each PRS of the plurality of PRSs 670 is received.

In aspects, UE 115 may perform LOS detection on each PRS of the plurality of PRSs 670. For example, as described above, UE 115 may apply LOS detection algorithms to each PRS of the plurality of PRSs 670 to determine whether each PRS includes an LOS signal and/or an NLOS signal. In aspects, the LOS detection, in addition with PRS signal strength measurements, may enable UE 115 to identify which LOS condition (e.g., which of LOS conditions 1-4) each PRS is on.

In aspects, UE 115 may determine UE 115's location based on the PRS measurements and the LOS detection results obtained by UE 115's. In aspects, as noted above, UE 115 may analyze the PRS measurements, such as the timing measurements, for each PRS and may determine UE 115's location based on the timing measurements. In aspects, UE 115 may also determine UE 115's location based on known locations of the network entities (e.g., anchors and serving base station). For example, UE 115 may know the location of each base station and UE in the network. Knowing the location of each base station and UE in the network associated with each PRS in the plurality of PRSs 670, UE 115 may determine its location based on the timing measurements in the PRS measurements for each received PRS. In some aspects, UE 115 may determine UE 115's location additionally based on an LOS condition of each PRS in the plurality of PRSs 670.

During operation, UE 115 may transmit message 675 to LMF network entity 490. Message 572 may include the UE's location determined by UE 115.

In aspects, UE 115 may perform beam management procedures using the determined UE's location and LOS measurements obtained from the PRSs of the plurality of PRSs 670. In some aspects, UE 115 may perform beam management by searching for a beam in an SSB associated with network entities from which a PRS having an LOS signal was received. In these aspects, UE 115 does not search for an SSB on network entities from which a PRS was received that did not include an LOS path.

In other aspects, rather than scanning all network entities from which a PRS having an LOS signal was received, UE 115 may perform beam management by transmitting a request to a serving cell requesting an indication as to whether a particular network entity (e.g., a base station or a UE) is configured for communication over a same frequency band or a higher frequency band as the frequency band over which the PRS was received from the network entity. In aspects, the serving base station may obtain the requested information (e.g., from stored network configuration or from neighboring cells via an Xn interface) and may provide the information to UE 115. In some aspects, the serving base station may further provide to UE 115 a recommendation as to which network entity to connect to. For example, UE 115 may request information on cell #2 from serving base station 105, and serving base station 105 may provide the requested information on cell #2, but may further recommend that UE 115 establish a communication link with cell #4.

In some aspects, the request may be sent by UE to LMF network entity 490, rather than the serving base station. LMF network entity 490 may similarly provide a recommendation for a network entity with which UE 115 may establish a communication link.

In some optional aspects, UE 115 may report the LOS conditions of the received PRS to LMF network entity 490. In these aspects, LMF network entity 490 may provide functionality as discussed above with respect to FIGS. 4 and 5 to generate and transmit PRS-assisted beam management messages to other network entities in order to provide PRS-assisted beam management in accordance with aspects of the present disclosure.

Figure 7:
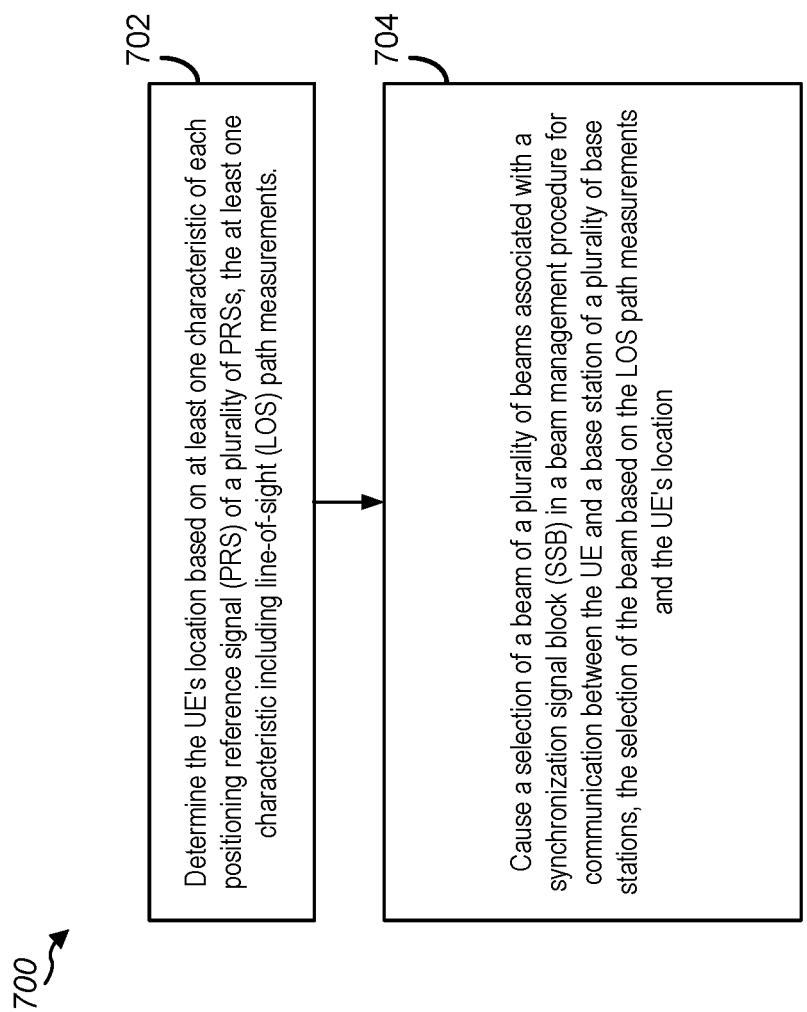
FIG. 7 is a flow diagram illustrating an example process that supports PRS-assisted beam management according to one or more aspects of the present disclosure.

FIG. 7 is a flow diagram illustrating an example process 700 that supports PRS-assisted beam management according to one or more aspects of the present disclosure. Operations of process 700 may be performed by a UE, such as UE 115 described above with reference to FIGS. 1-6, or a UE described with reference to FIG. 12. For example, example operations (also referred to as "blocks") of process 700 may enable UE 115 to support PRS-assisted beam management in accordance with aspects of the present disclosure.

In block 702, the UE 115 determines the UE's location based on at least one characteristic of each PRS of a plurality of PRSs. In aspects, the at least one characteristic includes LOS path measurements, and includes one or more of an RSTD measurement, an RSRP measurement, and a transmitter-receiver time difference measurement.

In aspects, UE 115 receives the plurality of PRSs from the plurality of base stations, which may include a serving base station of the UE, and measures the at least one characteristic of each PRS of the plurality of PRS. In aspects, UE 115 generates a PRS measurement report, for each PRS of the plurality of PRSs, that includes the measured characteristics of a respective PRS. UE 115 transmits the PRS measurement report for one or more PRS to an LMF network entity (e.g., LMF network entity 490). In aspects, transmitting the PRS measurement reports to the LMF network entity causes the LMF network entity to determine the UE's location based on the at least one characteristic of each PRS of the plurality of PRS in the PRS measurement report. In these aspects, UE 115 receives, from the LMF network entity, an indication of the UE's location. UE 115 determines the UE's location based on the indication. In these aspects, the LMF network entity performs LOS detection on each PRS of the plurality of PRSs.

In other aspects, UE 115 determines the UE's location based on the at least one characteristic of one or more PRS of the plurality of PRSs includes by receiving, from the LMF network entity, an indication of the UE's location, the UE's location determined by the LMF based on the at least one characteristic of each PRS of the plurality of PRSs, the at least one characteristic of each PRS of the plurality of PRSs received from a respective base station of the plurality of base stations. In aspects, UE 115 determines the UEs location based on the indication of the UE's location. In these aspects, the LMF network entity performs LOS detection on each PRS of the plurality of PRSs.

In yet other aspects, UE 115 determines the UE's location based on the at least one characteristic of one or more PRS of the plurality of PRSs by receiving each PRS of the plurality of PRSs from a respective base station of the plurality of base stations, measuring the at least one characteristic of each PRS of the plurality of PRSs, and determining the UEs location based on the measured at least one characteristic of each PRS of the plurality of PRSs. In these aspects, the UE performs LOS detection on each PRS of the plurality of PRSs.

In block 704, UE 115 causes a selection of a beam of a plurality of beams associated with an SSB in a beam management procedure for communication between the UE and a base station of a plurality of base stations. In aspects, the selection of the beam based on the LOS path measurements and the UE's location. In aspects, causing the selection of the beam for communication between the UE and the base station may include the UE selecting the beam based on the LOS path measurements and the UE's location. In other aspects, causing the selection of the beam for communication between the UE and the base station may include the base station selecting the beam based on the LOS path measurements and the UE's location.

Figure 12:
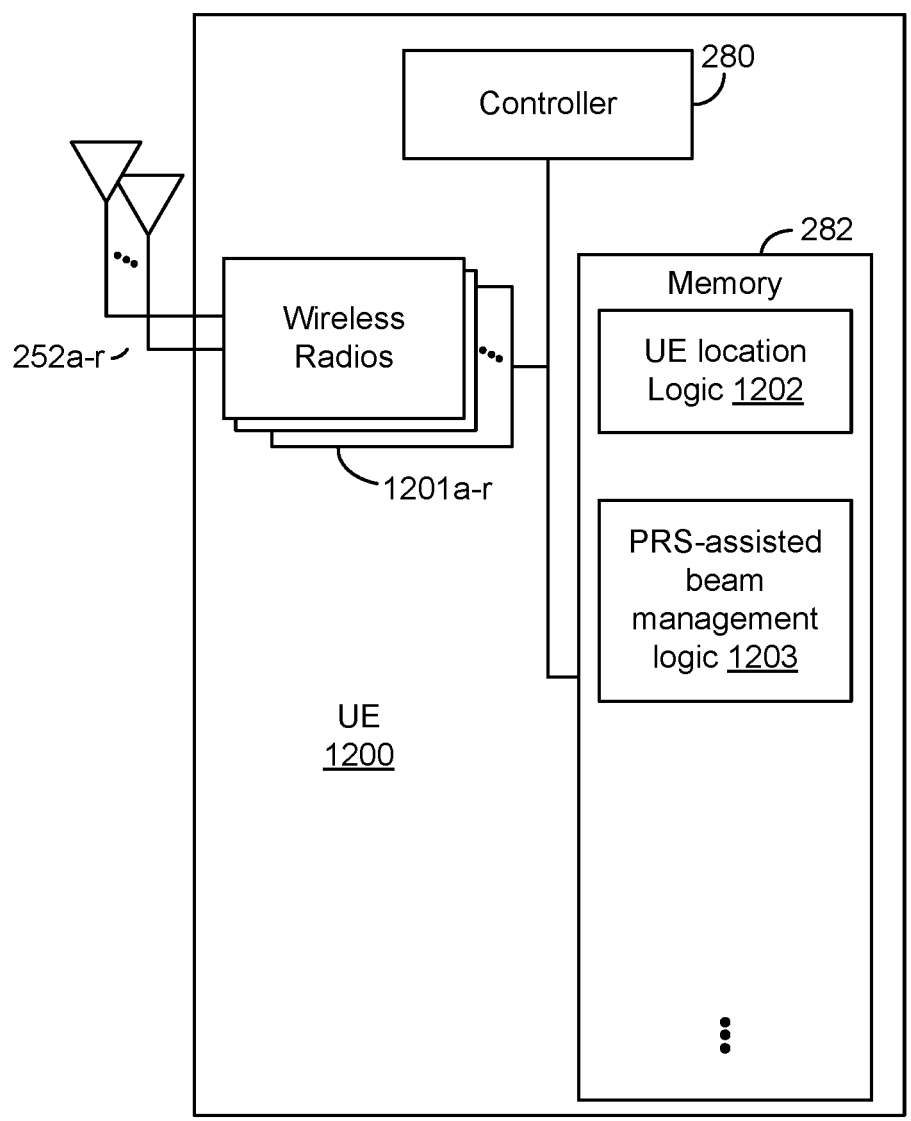
FIG. 12 is a block diagram of an example user equipment (UE) that supports PRS-assisted beam management according to one or more aspects of the present disclosure.

FIG. 12 is a block diagram of an example UE 1200 that supports PRS-assisted beam management according to one or more aspects. UE 1200 may be configured to perform operations, including the blocks of a process described with reference to FIGS. 7 and/or 10. In some implementations, UE 1200 includes the structure, hardware, and components shown and described with reference to UE 115 of FIGS. 1-6. For example, UE 1200 includes controller 280, which operates to execute logic or computer instructions stored in memory 282, as well as controlling the components of UE 1200 that provide the features and functionality of UE 1200. UE 1200, under control of controller 280, transmits and receives signals via wireless radios 1201*a-r* and antennas 252*a-r*. Wireless radios 1201*a-r* include various components and hardware, as illustrated in FIG. 2 for UE 115, including modulator and demodulators 254*a-r*, MIMO detector 256, receive processor 258, transmit processor 264, and TX MIMO processor 266.

Figure 13:
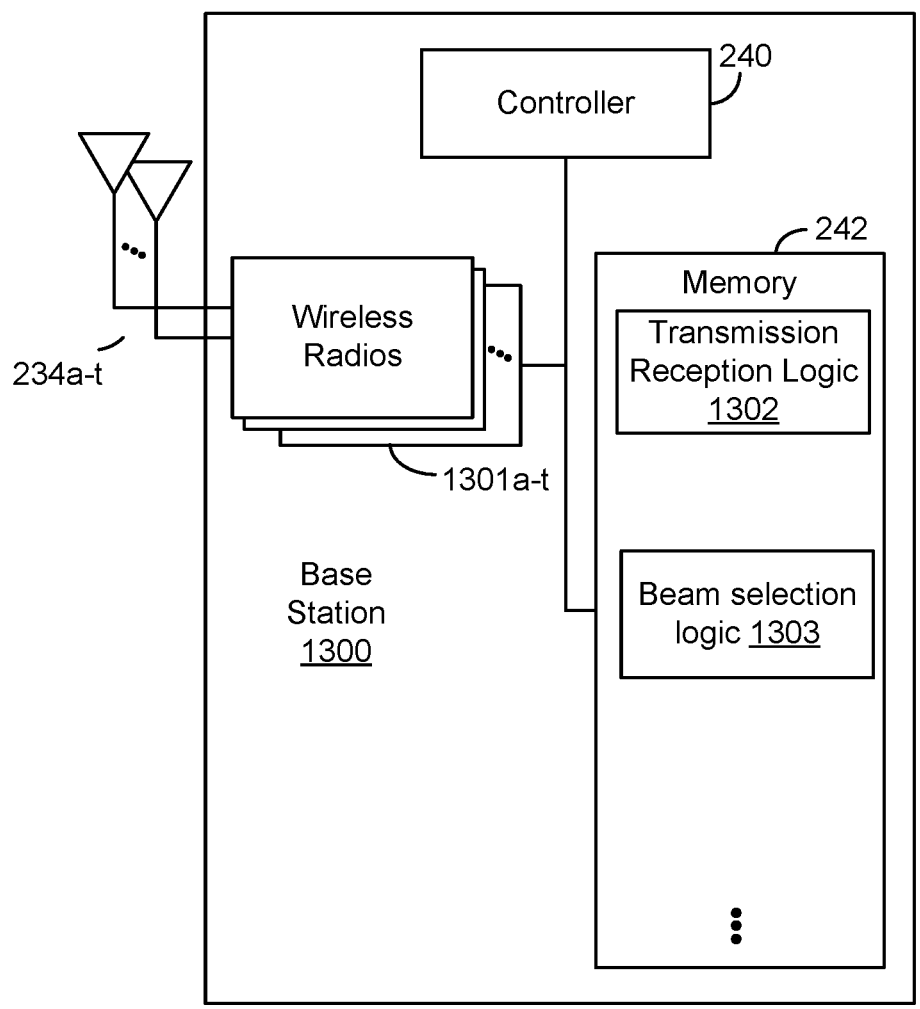
FIG. 13 is a block diagram of an example base station that supports PRS-assisted beam management according to one or more aspects of the present disclosure.

As shown, memory 282 may include UE location logic 1202 and PRS-assisted beam management logic 1203. UE location logic 1202 may be configured to determine a location of the UE and PRS-assisted beam management logic 1203 may be configured to measure characteristics of PRSs (e.g., LOS path measurements) received by UE 1200, to cause a selection of a beam, or to select a beam for communication between the UE and a network entity based on the UE's location and LOS path measurements. UE 1200 may receive signals from or transmit signals to one or more network entities, such as base station 105 of FIGS. 1-6, or a base station as illustrated in FIG. 13, and/or LMF network entity 490 of FIGS. 4-6.

Figure 8:
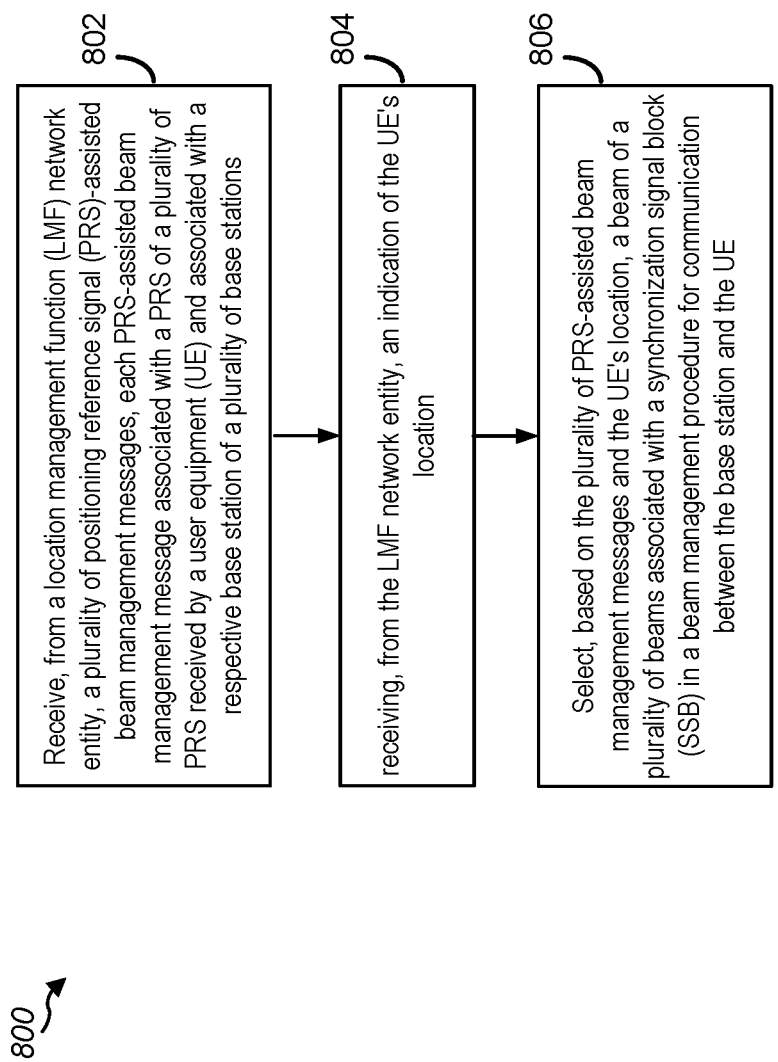
FIG. 8 is another flow diagram illustrating an example process that supports PRS-assisted beam management according to one or more aspects of the present disclosure.

FIG. 8 is a flow diagram illustrating an example process 800 that supports PRS-assisted beam management according to one or more aspects. Operations of process 800 may be performed by a base station, such as base station 105 described above with reference to FIGS. 1-6 or a base station as described above with reference to FIG. 13. For example, example operations of process 600 may enable base station 105 to support PRS-assisted beam management according to one or more aspects of the present disclosure.

At block 802, the base station 105 receives, from the LMF network entity (e.g., LMF network entity 490), a plurality of PRS-assisted beam management messages. In aspects, each PRS-assisted beam management message may be associated with a PRS of a plurality of PRS received by a UE (e.g., UE 115) and associated with a respective base station of a plurality of base stations.

At block 804, base station 105 receives, from the LMF network entity, an indication of the UE's location. At block 806, base station 105 selects, a beam of a plurality of beams associated with an SSB in a beam management procedure for communication between base station 105 and UE 115. In aspects, the selection of the beam based on the LOS path measurements in the PRS-assisted beam management messages and the UE's location.

FIG. 13 is a block diagram of an example base station 1300 that supports PRS-assisted beam management according to one or more aspects. Base station 1300 may be configured to perform operations, including the blocks of process 800 described with reference to FIG. 8. In some implementations, base station 1300 includes the structure, hardware, and components shown and described with reference to base station 105 of FIGS. 1-6. For example, base station 1300 may include controller 240, which operates to execute logic or computer instructions stored in memory 242, as well as controlling the components of base station 1300 that provide the features and functionality of base station 1300. Base station 1300, under control of controller 240, transmits and receives signals via wireless radios 1301a-t and antennas 1334a-t. Wireless radios 1301a-t include various components and hardware, as illustrated in FIG. 2 for base station 105, including modulator and demodulators 232a-t, transmit processor 220, TX MIMO processor 230, MIMO detector 236, and receive processor 238.

As shown, the memory 242 may include transmission and reception logic 1302, and beam selection logic 1303. Transmission and reception logic may be configured to receive PRS-assisted beam management messages and/or indications of the UE's location from LMF network entity 490. Beam selection logic 1303 may be configured to perform beam selection operations based on the UE's location and LOS path measurements in accordance with aspects of the present disclosure. Base station 1300 may receive signals from or transmit signals to one or more UEs, such as UE 115 of FIGS. 1-6 or UE 1200 of FIG. 12, and/or LMF network entity 490.

Figure 9:
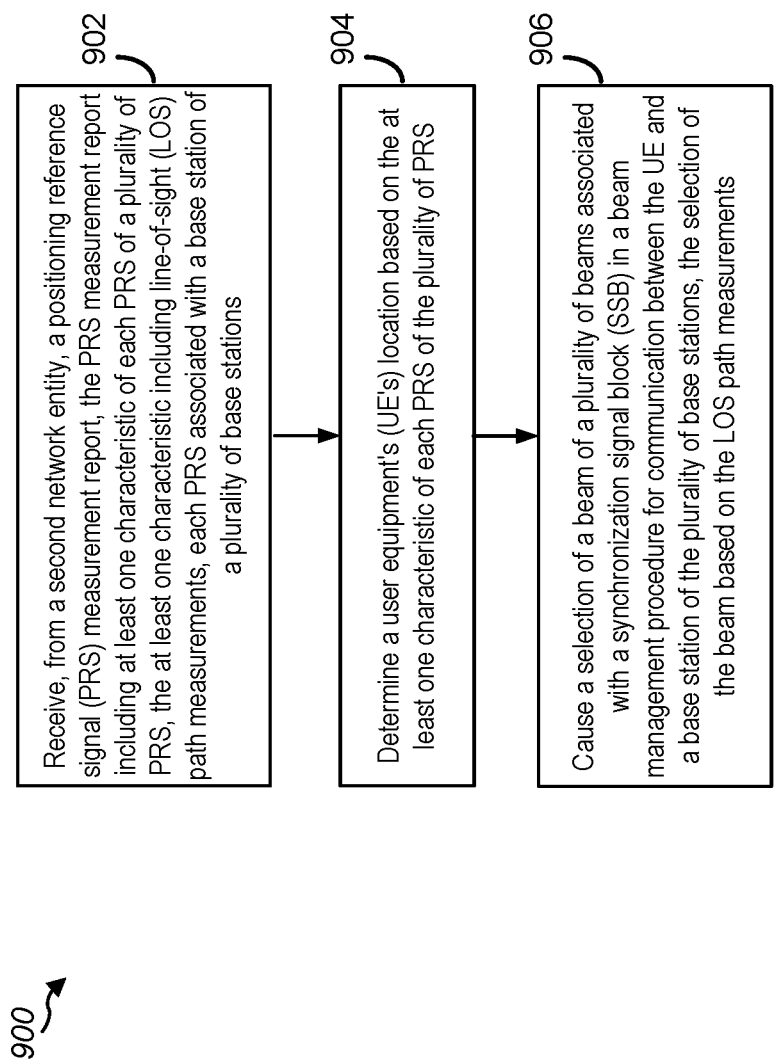
FIG. 9 is another flow diagram illustrating an example process that supports PRS-assisted beam management according to one or more aspects of the present disclosure.

FIG. 9 is a flow diagram illustrating an example process 900 that supports PRS-assisted beam management according to one or more aspects. Operations of process 900 may be performed by and LMF network entity, such as LMF network entity 490 described above with reference to FIGS. 4-6. For example, example operations of process 900 may enable LMF network entity 490 to support PRS-assisted beam management according to one or more aspects of the present disclosure.

At block 902, LMF network entity 490 receives, from a second network entity, a PRS measurement report. In aspects, the PRS measurement report including at least one characteristic of each PRS of a plurality of PRS, the at least one characteristic including LOS path measurements. In aspects, each PRS is associated with a base station of a plurality of base stations.

At block 904, LMF network entity 490 determines a UE's location based on the at least one characteristic of each PRS of the plurality of PRS. In aspects, At block 906, LMF network entity 490 causes a selection of a beam of a plurality of beams associated with an SSB in a beam management procedure for communication between the UE and a base station of the plurality of base stations. In aspects, the selection of the beam is based on the LOS path measurements.

Figure 10:
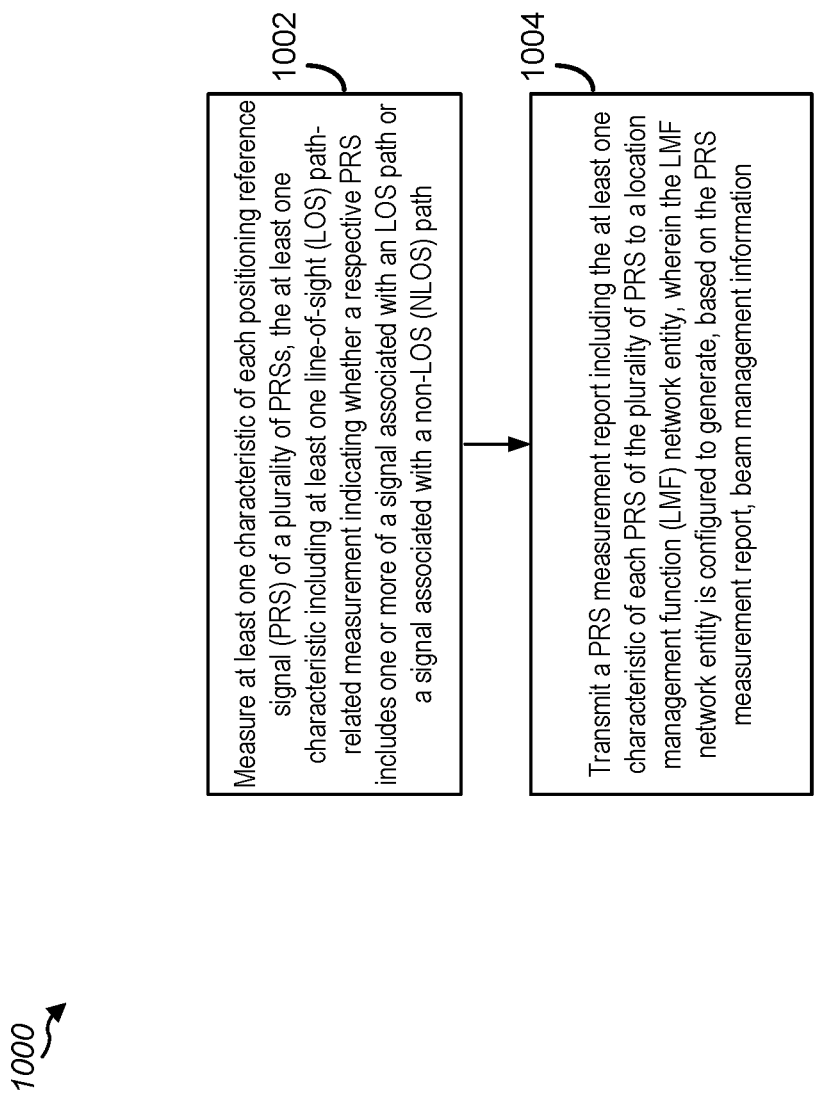
FIG. 10 is a flow diagram illustrating an example process that supports PRS-assisted beam management according to one or more aspects of the present disclosure.

FIG. 10 is a flow diagram illustrating an example process 1000 that supports PRS-assisted beam management according to one or more aspects of the present disclosure. Operations of process 1000 may be performed by a UE, such as UE 115 described above with reference to FIGS. 1-6, or a UE described with reference to FIG. 12. For example, example operations (also referred to as "blocks") of process 1000 may enable UE 115 to support PRS-assisted beam management in accordance with aspects of the present disclosure.

At block 1002, UE 115 measures at least one characteristic of each PRS of a plurality of PRSs. In aspects, the at least one characteristic may include at least one LOS path-related measurement indicating whether a respective PRS includes one or more of a signal associated with an LOS path or a signal associated with an NLOS path. In aspects, UE 115 may measure at least one characteristic of each PRS of a plurality of PRSs according to operations and functionality as described above with reference to UE 115 and as illustrated in FIGS. 3-6.

At bock 1004, UE 115 transmits a PRS measurement report including the at least one characteristic of each PRS of the plurality of PRS to an LMF network entity (e.g., LMF network entity 490). In aspects, the LMF network entity may be configured to generate, based on the PRS measurement report, beam management information. In aspects, UE 115 may transmit a PRS measurement report including the at least one characteristic of each PRS of the plurality of PRS to an LMF network entity according to operations and functionality as described above with reference to UE 115 and as illustrated in FIGS. 3-6.

Figure 11:
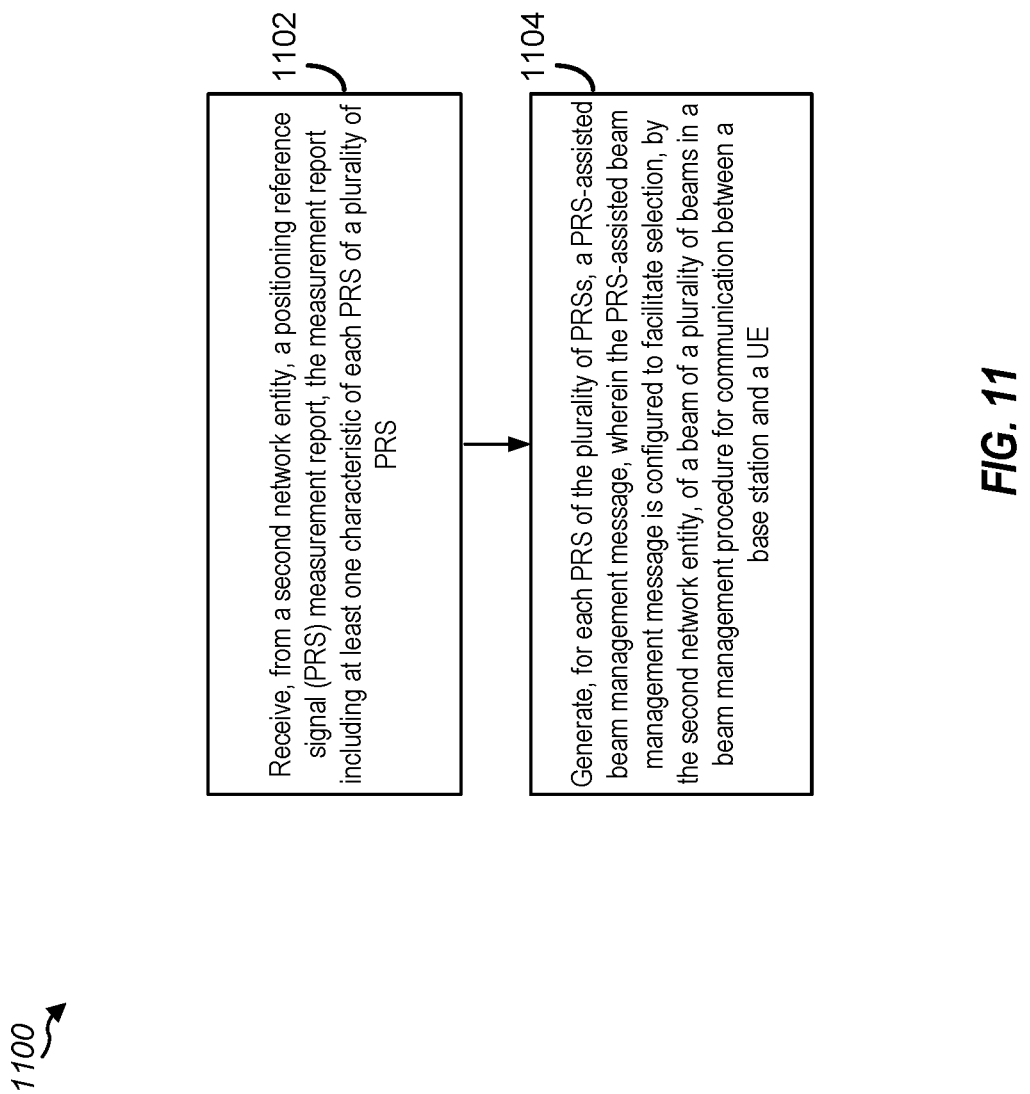
FIG. 11 is another flow diagram illustrating an example process that supports PRS-assisted beam management according to one or more aspects of the present disclosure.

FIG. 11 is a flow diagram illustrating an example process 1100 that supports PRS-assisted beam management according to one or more aspects. Operations of process 1100 may be performed by a first network entity, such as an LMF network entity (e.g., LMF network entity 490 described above with reference to FIGS. 4-6). For example, example operations of process 1100 may enable LMF network entity 490 to support PRS-assisted beam management according to one or more aspects of the present disclosure.

At block 1102, LMF network entity 490 receives, from a second network entity (e.g., a UE or a base station) a PRS measurement report. In aspects, the PRS measurement report may include at least one characteristic of each PRS of a plurality of PRS, the at least one characteristic including LOS path measurements. In aspects, each PRS is associated with a base station of a plurality of base stations. In aspects, LMF network entity 490 may receive, from a second network entity a PRS measurement report according to operations and functionality as described above with reference to LMF network entity 490 and as illustrated in FIGS. 3-6.

At block 1104, LMF network entity 490 generates, for each PRS of the plurality of PRSs, a PRS-assisted beam management message. In aspects, the PRS-assisted beam management message, may be configured to facilitate selection, by the second network entity, of a beam of a plurality of beams in a beam management procedure for communication between a base station and a UE. In aspects, each PRS is associated with a base station of a plurality of base stations. In aspects, LMF network entity 490 may generate, for each PRS of the plurality of PRSs, a PRS-assisted beam management message according to operations and functionality as described above with reference to LMF network entity 490 and as illustrated in FIGS. 3-6.

It is noted that one or more blocks (or operations) described with reference to FIGS. 7-11 may be combined with one or more blocks (or operations) described with reference to another of the figures. For example, one or more blocks (or operations) of FIG. 7 may be combined with one or more blocks (or operations) of FIG. 8. As another example, one or more blocks associated with FIG. 8 may be combined with one or more blocks associated with FIG. 9. As another example, one or more blocks associated with FIG. 7-11 may be combined with one or more blocks (or operations) associated with FIGS. 1-6. Additionally, or alternatively, one or more operations described above with reference to FIGS. 1-11 may be combined with one or more operations described with reference to FIG. 12 or 13.

In some aspects, techniques for supporting PRS-assisted beam management may include additional aspects, such as any single aspect or any combination of aspects described below or in connection with one or more other processes or devices described elsewhere herein. In a first aspect, techniques for supporting PRS-assisted beam management may include determining a UE's location based on at least one characteristic of each PRS of a plurality of PRSs. In aspects, the at least one characteristic includes line-of-sight (LOS) path measurements. The techniques in the first aspect may also include causing a selection of a beam of a plurality of beams in a beam management procedure for communication between the UE and a base station of a plurality of base stations. In aspects, the selection of the beam is based on the LOS path measurements and the UE's location. In some examples, the techniques in the first aspect may be implemented in a method or process. In some examples, the techniques of the first aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a second aspect, alone or in combination with the first aspect, the at least one characteristic further includes one or more of: an RSTD measurement, an RSRP measurement, and a transmitter-receiver time difference measurement.

In a third aspect, alone or in combination with one or more of the first aspect or the second aspect, the techniques in the first aspect may include receiving the plurality of PRSs from the plurality of base stations.

In a fourth aspect, in combination with the third aspect, the techniques in the first aspect may include measuring the at least one characteristic of each PRS of the plurality of PRS In a fifth aspect, alone or in combination with one or more of the first aspect through the fourth aspect, the techniques in the first aspect may include generating a PRS measurement report, the PRS measurement report including the measured at least one characteristic of each PRS of the plurality of PRS.

In a sixth aspect, in combination with the fifth aspect, the techniques in the first aspect may also include transmitting the PRS measurement report to a location management function (LMF) network entity. In these aspects, transmitting the PRS measurement report to the LMF network entity causes the LMF network entity to determine the UE's location based on the at least one characteristic of each PRS of the plurality of PRS in the PRS measurement report.

In a seventh aspect, alone or in combination with one or more of the first aspect through the sixth aspect, determining the UE's location based on the at least one characteristic of each PRS of the plurality of PRSs includes receiving, from the LMF network entity, an indication of the UE's location.

In an eighth aspect, in combination with the seventh aspect, determining the UE's location based on the at least one characteristic of each PRS of the plurality of PRSs includes determining the UEs location based on the indication of the UE's location.

In a ninth aspect, alone or in combination with one or more of the first aspect through the eighth aspect, causing the selection of the beam in the beam management procedure includes causing the LMF network entity to detect, based on the LOS path measurements of each PRS of the plurality of PRS, an LOS condition for each PRS of the plurality of PRS. In these aspects, determining the LOS condition for each PRS includes determining whether a respective PRS includes one or more of a signal associated with an LOS path and a signal associated with an NLOS path.

In a tenth aspect, alone or in combination with one or more of the first aspect through the ninth aspect, causing the selection of the beam in the beam management procedure further includes causing the LMF network entity to generate, for each PRS of the plurality of PRSs, a PRS-assisted beam management message. In these aspects, the PRS-assisted beam management message includes one or more of: the LOS condition of a respective PRS associated with a respective base station of the plurality of base stations; a confidence level indicating a probability that the LOS condition associated with the respective PRS is correct; the UE's location; an indication of a distance between the UE and the respective base station; an RSRP of the respective PRS; a cell identification (ID) associated with the respective base station; a PRS ID of the respective PRS; and a TRP associated with the respective PRS.

In an eleventh aspect, alone or in combination with one or more of the first aspect through the tenth aspect, causing the selection of the beam in the beam management procedure further includes causing the LMF network entity to transmit the PRS-assisted beam management message for each PRS of the plurality of PRSs to the base station. In these aspects, the base station selects the beam for communication between the UE and the base station of the plurality of base stations based on the PRS-assisted beam management message for each PRS of the plurality of PRSs.

In a twelfth aspect, alone or in combination with one or more of the first aspect through the eleventh aspect, the LOS condition of the respective PRS includes one of: an indication that the respective PRS includes a single signal associated with an LOS path, an indication that the respective PRS includes a single signal associated with an NLOS path, an indication that the respective PRS includes a signal associated with the LOS path and a signal associated with the NLOS path, wherein a signal strength of the signal associated with the LOS path is greater than a signal strength of the signal associated with the NLOS path, and an indication that the respective PRS includes the signal associated with the LOS path and the signal associated with the NLOS path, wherein the signal strength of the signal associated with the NLOS path is greater than the signal strength of the signal associated with the LOS path.

In a thirteenth aspect, alone or in combination with one or more of the first aspect through the twelfth aspect, determining the UE's location based on the at least one characteristic of each PRS of the plurality of PRSs includes receiving, from an LMF network entity, an indication of the UE's location. In these aspects, the UE's location is determined by the LMF based on the at least one characteristic of each PRS of the plurality of PRSs, and the at least one characteristic of each PRS of the plurality of PRSs is received from a respective base station of the plurality of base stations.

In a fourteenth aspect, in combination with the thirteenth aspect, determining the UE's location based on the at least one characteristic of each PRS of the plurality of PRSs includes determining the UEs location based on the indication of the UE's location.

In a fifteenth aspect, alone or in combination with one or more of the first aspect through the fourteenth aspect, the techniques in the first aspect may also include receiving, from the LMF, an LOS condition for each PRS of the plurality of PRS. In these aspects, the LOS condition for each PRS indicates whether a respective PRS includes one or more of a signal associated with an LOS path and a signal associated with a non-LOS (NLOS) path.

In a sixteenth aspect, alone or in combination with one or more of the first aspect through the fifteenth aspect, determining the UE's location based on the at least one characteristic of each PRS of the plurality of PRSs includes receiving each PRS of the plurality of PRSs from a respective base station of the plurality of base stations.

In a seventeenth aspect, in combination with the sixteenth aspect, determining the UE's location based on the at least one characteristic of each PRS of the plurality of PRSs includes measuring the at least one characteristic of each PRS of the plurality of PRSs.

In an eighteenth aspect, in combination with the sixteenth or seventeenth aspect, determining the UE's location based on the at least one characteristic of each PRS of the plurality of PRSs includes determining by the UE, the UEs location based on the measured at least one characteristic of each PRS of the plurality of PRSs.

In a nineteenth aspect, alone or in combination with one or more of the first aspect through the eighteenth aspect, the techniques in the first aspect may also include determining, for each PRS of the plurality of PRSs, an LOS condition. In these aspects, determining the LOS condition for each PRS includes determining whether a respective PRS includes one or more of a signal associated with an LOS path and a signal associated with an NLOS path.

In a twentieth aspect, alone or in combination with one or more of the first aspect through the nineteenth aspect, the techniques in the first aspect may also include transmitting, to a serving base station, a request for service information about at least one of a base station of the plurality of base stations associated with a PRS having an LOS path signal. In these aspects, the request for service information includes a request whether the at least one base station is configured to provide communication in a frequency band that is the same or higher than the frequency band in which the PRS having the LOS was received.

In a twenty-first aspect, alone or in combination with one or more of the first aspect through the twentieth aspect, causing the selection of a beam based on the LOS path measurements and the UE's location includes selecting, by the UE, the beam for communication with the base station based on the LOS path measurements and the UE's location.

In a twenty-second aspect, alone or in combination with one or more of the first aspect through the twenty-first aspect, the plurality of PRSs is received in a first frequency range, and the selected beam is in a second frequency range.

In a twenty-third aspect, alone or in combination with one or more of the first aspect through the twenty-second aspect, the second frequency range is different than the first frequency range.

In a twenty-fourth aspect, alone or in combination with one or more of the first aspect through the twenty-third aspect, the beam of the plurality of beams is associated with an SSB.

In a twenty-fifth aspect, techniques for supporting PRS-assisted beam management may include receiving, from a location management function (LMF) network entity, a plurality of PRS-assisted beam management messages, each PRS-assisted beam management message associated with a PRS of a plurality of PRS received by a UE and associated with a respective base station of a plurality of base stations. The techniques in the twenty-fifth aspect may also include receiving, from the LMF network entity, an indication of the UE's location, and selecting, based on the plurality of PRS-assisted beam management messages and the UE's location, a beam of a plurality of beams in a beam management procedure for communication between the base station and the UE. In some examples, the techniques in the twenty-fifth aspect may be implemented in a method or process. In some examples, the techniques in the twenty-fifth aspect may be implemented in a wireless communication device such as a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a twenty-sixth aspect, alone or in combination with one or more of the first aspect through the twenty-fifth aspect, the techniques in the twenty-fifth aspect may also include transmitting, to the LMF network entity, a request for the plurality of PRS-assisted beam management messages.

In a twenty-seventh aspect, alone or in combination with one or more of the first aspect through the twenty-sixth aspect, each PRS-assisted beam management message of the plurality of PRS-assisted beam management messages includes one or more of: the LOS condition of a respective PRS associated with a respective base station of the plurality of base stations; a confidence level indicating a probability that the LOS condition associated with the respective PRS is correct; the UE's location; an indication of a distance between the UE and the respective base station; an RSRP of the respective PRS; a cell ID associated with the respective base station; a PRS ID of the respective PRS; and a TRP associated with the respective PRS.

In a twenty-eighth aspect, alone or in combination with one or more of the first aspect through the twenty-seventh aspect, the respective base station is the base station.

In a twenty-ninth aspect, alone or in combination with one or more of the first aspect through the twenty-eighth aspect, the LOS condition of the respective PRS includes one of: an indication that the respective PRS includes a single signal associated with an LOS path, an indication that the respective PRS includes a single signal associated with an NLOS path, an indication that the respective PRS includes a signal associated with the LOS path and a signal associated with the NLOS path, wherein a signal strength of the signal associated with the LOS path is greater than a signal strength of the signal associated with the NLOS path, and an indication that the respective PRS includes the signal associated with the LOS path and the signal associated with the NLOS path, wherein the signal strength of the signal associated with the NLOS path is greater than the signal strength of the signal associated with the LOS path.

In a thirtieth aspect, alone or in combination with one or more of the first aspect through the twenty-ninth aspect, the plurality of PRSs is received by the UE in a first frequency range, and selecting the beam includes selecting the beam in a second frequency range.

In a thirty-first aspect, alone or in combination with one or more of the first aspect through the thirtieth aspect, the second frequency range is different than the first frequency range.

In a thirty-second aspect, alone or in combination with one or more of the first aspect through the thirty-first aspect, the beam of the plurality of beams is associated with an SSB.

In a thirty-third aspect, techniques for supporting PRS-assisted beam management may include receiving, by a first network entity from a second network entity, a PRS measurement report, the measurement report including at least one characteristic of each PRS of a plurality of PRS. In aspects, the at least one characteristic includes LOS path measurements, and each PRS is associated with a base station of a plurality of base stations. The techniques in the thirty-third aspect may also include determining a UE's location based on the at least one characteristic of each PRS of the plurality of PRS, and causing a selection of a beam of a plurality of beams in a beam management procedure for communication between the UE and a base station of the plurality of base stations. In aspects, the selection of the beam based on the LOS path measurements. In some examples, the techniques in the thirty-third aspect may be implemented in a method or process. In some examples, the techniques in the thirty-third aspect may be implemented in a wireless communication device such as an LMF network entity or a component of an LMF network entity, a base station or a component of a base station, or a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a thirty-fourth aspect, alone or in combination with one or more of the first aspect through the thirty-fourth aspect, the at least one characteristic further includes one or more of: an RSTD measurement, an RSRP measurement, and a transmitter-receiver time difference measurement.

In a thirty-fifth aspect, alone or in combination with one or more of the first aspect through the thirty-third aspect, the techniques in the thirty-third aspect may also include transmitting, to the UE, an indication of the determined UE's location.

In a thirty-sixth aspect, alone or in combination with one or more of the first aspect through the thirty-fifth aspect, causing the selection of the beam in the beam management procedure includes generating, for each PRS of the plurality of PRSs, a PRS-assisted beam management message. In these aspects, the PRS-assisted beam management message includes one or more of: the LOS condition of a respective PRS associated with a respective base station of the plurality of base stations; a confidence level indicating a probability that the LOS condition associated with the respective PRS is correct; the UE's location; an indication of a distance between the UE and the respective base station; an RSRP of the respective PRS; a cell ID associated with the respective base station; a PRS ID of the respective PRS; and a TRP associated with the respective PRS.

In a thirty-seventh aspect, alone or in combination with one or more of the first aspect through the thirty-sixth aspect, techniques in the thirty-third aspect may also include detecting, based on the LOS path measurements of each PRS of the plurality of PRS, the LOS condition for each PRS of the plurality of PRS. In these aspects, determining the LOS condition for each PRS includes determining whether a respective PRS includes one or more of a signal associated with an LOS path and a signal associated with an NLOS path.

In a thirty-eighth aspect, alone or in combination with one or more of the first aspect through the thirty-seventh aspect, the LOS condition of the respective PRS includes one of: an indication that the respective PRS includes a single signal associated with an LOS path, an indication that the respective PRS includes a single signal associated with an NLOS path, an indication that the respective PRS includes a signal associated with the LOS path and a signal associated with the NLOS path, wherein a signal strength of the signal associated with the LOS path is greater than a signal strength of the signal associated with the NLOS path, and an indication that the respective PRS includes the signal associated with the LOS path and the signal associated with the NLOS path, wherein the signal strength of the signal associated with the NLOS path is greater than the signal strength of the signal associated with the LOS path.

In a thirty-ninth aspect, alone or in combination with one or more of the first aspect through the thirty-eighth aspect, causing the selection of the beam in the beam management procedure includes transmitting the PRS-assisted beam management message to the base station of the plurality of base stations. In these aspects, the base station selects the beam for communication between the UE and the base station of the plurality of base stations based on the PRS-assisted beam management message.

In a fortieth aspect, alone or in combination with one or more of the first aspect through the thirty-ninth aspect, the plurality of PRSs is received by the second network entity in a first frequency range. In these aspects, causing the selection of the beam in the beam management procedure includes causing a third network entity to select the beam in a second frequency rang.

In a forty-first aspect, alone or in combination with one or more of the first aspect through the fortieth aspect, the second frequency range is different than the first frequency range.

In a forty-second aspect, alone or in combination with one or more of the first aspect through the forty-first aspect, the beam of the plurality of beams is associated with an SSB.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-11 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   measuring at least one characteristic of each positioning reference signal (PRS) of a plurality of PRSs, the at least one characteristic including at least one line-of-sight (LOS) path-related measurement indicating whether a respective PRS includes one or more of a signal associated with an LOS path or a signal associated with a non-LOS (NLOS) path;
   transmitting a PRS measurement report including the at least one characteristic of each PRS of the plurality of PRSs to a location management function (LMF) network entity, wherein the LMF network entity is configured to generate, based on the PRS measurement report, beam management information;
   receiving, from the LMF network entity, the beam management information, wherein the beam management information includes a LOS condition confidence level indicating a probability that the LOS path-related measurement associated with the respective PRS is correct; and
   selecting, by the UE, a beam of a plurality of beams in a beam management procedure for communication between the UE and a base station of a plurality of base stations based at least in part on the LOS condition confidence level of the beam management information.

2. The method of claim 1, wherein the at least one characteristic further includes one or more of: a reference signal time difference (RSTD) measurement, a reference signal received power (RSRP) measurement, and transmitter-receiver time difference measurement.

3. The method of claim 1, wherein the beam management information further includes one or more of:
   the LOS path-related measurement for a respective PRS associated with a respective base station of a plurality of base stations from which the plurality of PRSs is received;
   a location of the UE;
   an indication of a distance between the UE and the respective base station;
   a reference signal received power (RSRP) of the respective PRS;
   a cell identification (ID) associated with the respective base station;
   a PRS ID of the respective PRS; and
   a transmission and reception point (TRP) associated with the respective PRS.

4. The method of claim 1, wherein the LOS path-related measurement for the respective PRS includes one of:
   an indication that the respective PRS includes a single signal associated with an LOS path;
   an indication that the respective PRS includes a single signal associated with an NLOS path;
   an indication that the respective PRS includes a signal associated with the LOS path and a signal associated with the NLOS path, wherein a signal strength of the signal associated with the LOS path is greater than a signal strength of the signal associated with the NLOS path; or
   an indication that the respective PRS includes the signal associated with the LOS path and the signal associated with the NLOS path, wherein the signal strength of the signal associated with the NLOS path is greater than the signal strength of the signal associated with the LOS path.

5. The method of claim 1, further comprising:
   receiving, from the LMF, an LOS condition for each PRS of the plurality of PRSs, wherein the LOS condition for each PRS indicates whether a respective PRS includes one or more of the signal associated with the LOS path and the signal associated with the NLOS path.

6. The method of claim 1, further comprising:
   determining a location of the UE based on the at least one characteristic of each PRS of the plurality of PRSs.

7. The method of claim 6, wherein determining the location of the UE based on the at least one characteristic of each PRS of the plurality of PRSs includes:
   receiving each PRS of the plurality of PRSs from a respective base station of a plurality of base stations;

measuring the at least one characteristic of each PRS of the plurality of PRSs; and determining by the UE, the location of the UE based on the measured at least one characteristic of each PRS of the plurality of PRSs.

8. The method of claim 1, further comprising:
transmitting, to a serving base station, a request for service information about at least one base station associated with a PRS having an LOS path signal, wherein the request for service information includes a request whether the at least one base station is configured to provide communication in a frequency band that is the same or higher than the frequency band in which the PRS having the LOS was received.

9. The method of claim 1, wherein the plurality of PRSs is received in a first frequency range, and the selected beam is in a second frequency range different than the first frequency range.

10. The method of claim 1, wherein the beam of the plurality of beams is associated with a synchronization signal block (SSB).

11. The method of claim 1, wherein the LMF network entity is further configured to generate an estimate of a location of the UE, further comprising:
receiving, from the LMF network entity, the estimate of the location of the UE, wherein the selecting the beam of the plurality of beams is further based at least in part on the estimate of the location of the UE.

12. A method of wireless communication performed by a base station, the method comprising:
receiving, from a location management function (LMF) network entity, a plurality of positioning reference signal (PRS)-assisted beam management messages, each PRS-assisted beam management message associated with a PRS of a plurality of PRSs received by a user equipment (UE) and associated with a respective base station of a plurality of base stations, wherein each PRS-assisted beam management message of the plurality of PRS-assisted beam management messages includes a line-of-sight (LOS) condition confidence level indicating a probability that a LOS condition associated with the respective PRS is correct; and selecting, based at least in part on one or more LOS condition confidence level of the LOS condition confidence levels of the plurality of PRS-assisted beam management messages, a beam of a plurality of beams in a beam management procedure for communication between the base station and the UE.

13. The method of claim 12, further comprising:
transmitting, to the LMF network entity, a request for the plurality of PRS-assisted beam management messages.

14. The method of claim 13, wherein each PRS-assisted beam management message of the plurality of PRS-assisted beam management messages includes one or more of:
the LOS condition of a respective PRS associated with a respective base station of the plurality of base stations;
an indication of a location of the UE;
an indication of a distance between the UE and the respective base station;
a reference signal received power (RSRP) of the respective PRS;
a cell identification (ID) associated with the respective base station;
a PRS ID of the respective PRS; and
a transmission and reception point (TRP) associated with the respective PRS.

15. The method of claim 14, wherein the LOS condition of the respective PRS includes one of:
an indication that the respective PRS includes a single signal associated with an LOS path;
an indication that the respective PRS includes a single signal associated with a non-LOS (NLOS) path;
an indication that the respective PRS includes a signal associated with the LOS path and a signal associated with the NLOS path, wherein a signal strength of the signal associated with the LOS path is greater than a signal strength of the signal associated with the NLOS path; or
an indication that the respective PRS includes the signal associated with the LOS path and the signal associated with the NLOS path, wherein the signal strength of the signal associated with the NLOS path is greater than the signal strength of the signal associated with the LOS path.

16. The method of claim 12, wherein the plurality of PRSs is received by the UE in a first frequency range, and wherein selecting the beam includes selecting the beam in a second frequency range different than the first frequency range.

17. The method of claim 12, further comprising:
receiving, from the LMF network entity, an indication of an estimate of a location of the UE, wherein the selecting the beam of the plurality of beams is further based at least in part on the estimate of the location of the UE.

18. A method of wireless communication performed by a first network entity, the method comprising:
receiving, from a second network entity, a positioning reference signal (PRS) measurement report, the measurement report including at least one characteristic of each PRS of a plurality of PRSs;
generating, for each PRS of the plurality of PRSs, a PRS-assisted beam management message, wherein the PRS-assisted beam management message is configured to facilitate selection, by the second network entity, of a beam of a plurality of beams in a beam management procedure for communication between a base station and a UE, and wherein the PRS-assisted beam management message includes a line-of-sight (LOS) condition confidence level indicating a probability that a LOS condition associated with the respective PRS is correct; and
transmitting, to the second network entity, the PRS-assisted beam management message including the LOS condition confidence level, wherein the second network entity selects the beam for communication between the UE and the base station based at least in part on the LOS condition confidence level of the PRS-assisted beam management message.

19. The method of claim 18, wherein the at least one characteristic includes at least one LOS path-related measurement by the second network entity.

20. The method of claim 19, further comprising:
detecting, based on the LOS path-related measurement of each PRS of the plurality of PRSs, an LOS condition for each PRS of the plurality of PRSs, wherein determining the LOS condition for each PRS includes determining whether a respective PRS includes one or more of a signal associated with an LOS path and a signal associated with a non-LOS (NLOS) path.

21. The method of claim 20, wherein the LOS condition of the respective PRS includes one of:

an indication that the respective PRS includes a single signal associated with an LOS path;
an indication that the respective PRS includes a single signal associated with a non-LOS (NLOS) path;
an indication that the respective PRS includes a signal associated with the LOS path and a signal associated with the NLOS path, wherein a signal strength of the signal associated with the LOS path is greater than a signal strength of the signal associated with the NLOS path; or
an indication that the respective PRS includes the signal associated with the LOS path and the signal associated with the NLOS path, wherein the signal strength of the signal associated with the NLOS path is greater than the signal strength of the signal associated with the LOS path.

22. The method of claim 19, wherein the at least one characteristic further includes one or more of: a reference signal time difference (RSTD) measurement, a reference signal received power (RSRP) measurement, and transmitter-receiver time difference measurement.

23. The method of claim 18, wherein the PRS-assisted beam management message includes one or more of:
the LOS condition of a respective PRS of the plurality of PRSs associated with a respective base station of a plurality of base stations;
a location of the UE;
an indication of a distance between the UE and the respective base station;
a reference signal received power (RSRP) of the respective PRS;
a cell identification (ID) associated with the respective base station;
a PRS ID of the respective PRS; and
a transmission and reception point (TRP) associated with the respective PRS.

24. The method of claim 18, wherein the plurality of PRSs is received by the second network entity in a first frequency range, and wherein a third network entity selects the beam in the beam management procedure in a second frequency range different than the first frequency range.

25. The method of claim 18, further comprising:
determining an estimate of a location of the UE based on the at least one characteristic of each PRS of the plurality of PRSs in the PRS measurement report; and
transmitting, to the second network entity, the estimate of the location of the UE, wherein selection of the beam for communication between the UE and the base station is further based at least in part on the estimate of the location of the UE.

26. An apparatus configured for wireless communication, comprising:
a processing system that includes one or more processors and one or memories coupled to the one or more processors, the processing system configured to cause the apparatus to:
measure, by a user equipment (UE), at least one characteristic of each positioning reference signal (PRS) of a plurality of PRSs, the at least one characteristic including at least one line-of-sight (LOS) path-related measurement indicating whether a respective PRS includes one or more of a signal associated with an LOS path or a signal associated with a non-LOS (NLOS) path;
transmit, by the UE, a PRS measurement report including the at least one characteristic of each PRS of the plurality of PRSs to a location management function (LMF) network entity, wherein the LMF network entity is configured to generate, based on the PRS measurement report, beam management information;
receive, from the LMF network entity, the beam management information, wherein the beam management information includes a LOS condition confidence level indicating a probability that the LOS path-related measurement associated with the respective PRS is correct; and
select, by the UE, a beam of a plurality of beams in a beam management procedure for communication between the UE and a base station of a plurality of base stations based at least in part on the LOS condition confidence level of the beam management information.

27. The apparatus of claim 26, wherein the at least one characteristic further includes one or more of: a reference signal time difference (RSTD) measurement, a reference signal received power (RSRP) measurement, and transmitter-receiver time difference measurement.

28. The apparatus of claim 27, wherein the beam management information further includes one or more of:
the LOS path-related measurement for a respective PRS associated with a respective base station of a plurality of base stations from which the plurality of PRSs is received;
a location of the UE;
an indication of a distance between the UE and the respective base station;
a reference signal received power (RSRP) of the respective PRS;
a cell identification (ID) associated with the respective base station;
a PRS ID of the respective PRS; and
a transmission and reception point (TRP) associated with the respective PRS.

29. The apparatus of claim 26, wherein the LOS path-related measurement for the respective PRS includes one of:
an indication that the respective PRS includes a single signal associated with an LOS path;
an indication that the respective PRS includes a single signal associated with an NLOS path;
an indication that the respective PRS includes a signal associated with the LOS path and a signal associated with the NLOS path, wherein a signal strength of the signal associated with the LOS path is greater than a signal strength of the signal associated with the NLOS path; or
an indication that the respective PRS includes the signal associated with the LOS path and the signal associated with the NLOS path, wherein the signal strength of the signal associated with the NLOS path is greater than the signal strength of the signal associated with the LOS path.

30. The apparatus of claim 26, wherein the processing system is further configured to cause the apparatus to:
receiving, from the LMF, an LOS condition for each PRS of the plurality of PRSs, wherein the LOS condition for each PRS indicates whether a respective PRS includes one or more of the signal associated with the LOS path and the signal associated with the NLOS path.

31. The apparatus of claim 26, wherein the processing system is further configured to cause the apparatus to:
determine a location of the UE based on the at least one characteristic of each PRS of the plurality of PRSs.

32. The apparatus of claim 31, wherein configuration of the processing system to cause the apparatus to determine the location of the UE based on the at least one characteristic of each PRS of the plurality of PRSs includes configuration of the processing system to cause the apparatus to:
   receive each PRS of the plurality of PRSs from a respective base station of a plurality of base stations;
   measure the at least one characteristic of each PRS of the plurality of PRSs; and
   determine by the UE, the location of the UE based on the measured at least one characteristic of each PRS of the plurality of PRSs.

33. The apparatus of claim 26, wherein the processing system is further configured to cause the apparatus to:
   transmit, to a serving base station, a request for service information about at least one base station associated with a PRS having an LOS path signal, wherein the request for service information includes a request whether the at least one base station is configured to provide communication in a frequency band that is the same or higher than the frequency band in which the PRS having the LOS was received.

34. The apparatus of claim 26, wherein the plurality of PRSs is received in a first frequency range, and the selected beam is in a second frequency range different than the first frequency range.

35. The apparatus of claim 26, wherein the beam of the plurality of beams is associated with a synchronization signal block (SSB).

36. An apparatus configured for wireless communication, comprising:
   a processing system that includes one or more processors and one or more memories coupled to the one or more processors, the processing system configured to cause the apparatus to:
      receive, by a base station, from a location management function (LMF) network entity, a plurality of positioning reference signal (PRS)-assisted beam management messages, each PRS-assisted beam management message associated with a PRS of a plurality of PRSs received by a user equipment (UE) and associated with a respective base station of a plurality of base stations, wherein each PRS-assisted beam management message of the plurality of PRS-assisted beam management messages includes a line-of-sight (LOS) condition confidence level indicating a probability that a LOS condition associated with the respective PRS is correct;
      and
      select, by the base station, based at least in part on one or more LOS condition confidence level of the LOS condition confidence levels of the plurality of PRS-assisted beam management messages, a beam of a plurality of beams in a beam management procedure for communication between the base station and the UE.

37. The apparatus of claim 36, wherein each PRS-assisted beam management message of the plurality of PRS-assisted beam management messages includes one or more of:
   the LOS condition of a respective PRS associated with a respective base station of the plurality of base stations;
   an indication of a location of the UE;
   an indication of a distance between the UE and the respective base station;
   a reference signal received power (RSRP) of the respective PRS;
   a cell identification (ID) associated with the respective base station;
   a PRS ID of the respective PRS; and
   a transmission and reception point (TRP) associated with the respective PRS.

38. The apparatus of claim 37, wherein the LOS condition of the respective PRS includes one of:
   an indication that the respective PRS includes a single signal associated with an LOS path;
   an indication that the respective PRS includes a single signal associated with a non-LOS (NLOS) path;
   an indication that the respective PRS includes a signal associated with the LOS path and a signal associated with the NLOS path, wherein a signal strength of the signal associated with the LOS path is greater than a signal strength of the signal associated with the NLOS path; or
   an indication that the respective PRS includes the signal associated with the LOS path and the signal associated with the NLOS path, wherein the signal strength of the signal associated with the NLOS path is greater than the signal strength of the signal associated with the LOS path.

39. The apparatus of claim 36, wherein the plurality of PRSs is received by the UE in a first frequency range, and wherein selecting the beam includes selecting the beam in a second frequency range different than the first frequency range.

40. The apparatus of claim 36, wherein the beam of the plurality of beams is associated with a synchronization signal block (SSB).

41. An apparatus configured for wireless communication, comprising:
   a processing system that includes one or more processors and one or more memories coupled to the one or more processors, the processing system configured to cause the apparatus to:
      receive, by a first network entity from a second network entity, a positioning reference signal (PRS) measurement report, the measurement report including at least one characteristic of each PRS of a plurality of PRSs;
      generate, by the first network entity, for each PRS of the plurality of PRSs, a PRS-assisted beam management message, wherein the PRS-assisted beam management message is configured to facilitate selection, by the second network entity, of a beam of a plurality of beams in a beam management procedure for communication between a base station and a UE, and wherein the PRS-assisted beam management message includes a line-of-sight (LOS) condition confidence level indicating a probability that a LOS condition associated with the respective PRS is correct;
      and
      transmit, to the second network entity, the PRS-assisted beam management message including the LOS condition confidence level, wherein the second network entity selects the beam for communication between the UE and the base station based at least in part on the LOS condition confidence level of the PRS-assisted beam management message.

42. The apparatus of claim 41, wherein the at least one characteristic includes at least one LOS path-related measurement by the second network entity.

43. The apparatus of claim 42, wherein the processing system is further configured to cause the apparatus to:

detect, based on the LOS path-related measurement of each PRS of the plurality of PRSs, an LOS condition for each PRS of the plurality of PRSs, wherein configuration of processing system to cause the apparatus to determine the LOS condition for each PRS includes configuration of the processing system to cause the apparatus to determine whether a respective PRS includes one or more of a signal associated with an LOS path and a signal associated with a non-LOS (NLOS) path.

44. The apparatus of claim 43, wherein the LOS condition of the respective PRS includes one of:
   an indication that the respective PRS includes a single signal associated with an LOS path;
   an indication that the respective PRS includes a single signal associated with a non-LOS (NLOS) path;
   an indication that the respective PRS includes a signal associated with the LOS path and a signal associated with the NLOS path, wherein a signal strength of the signal associated with the LOS path is greater than a signal strength of the signal associated with the NLOS path; or
   an indication that the respective PRS includes the signal associated with the LOS path and the signal associated with the NLOS path, wherein the signal strength of the signal associated with the NLOS path is greater than the signal strength of the signal associated with the LOS path.

45. The apparatus of claim 42, wherein the at least one characteristic further includes one or more of: a reference signal time difference (RSTD) measurement, a reference signal received power (RSRP) measurement, and transmitter-receiver time difference measurement.

46. The apparatus of claim 41, wherein the PRS-assisted beam management message includes one or more of:
   the LOS condition of a respective PRS of the plurality of PRSs associated with a respective base station of a plurality of base stations;
   a location of the UE;
   an indication of a distance between the UE and the respective base station;
   a reference signal received power (RSRP) of the respective PRS;
   a cell identification (ID) associated with the respective base station;
   a PRS ID of the respective PRS; and
   a transmission and reception point (TRP) associated with the respective PRS.

47. The apparatus of claim 41, wherein the plurality of PRSs is received by the second network entity in a first frequency range, and wherein a third network entity selects the beam in the beam management procedure in a second frequency range different than the first frequency range.

* * * * *